United States Patent
Khlat et al.

(10) Patent No.: US 9,768,838 B2
(45) Date of Patent: *Sep. 19, 2017

(54) RECONFIGURABLE RF RECEIVE DIPLEXER

(71) Applicant: RF Micro Devices, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/820,006

(22) Filed: Aug. 6, 2015

(65) Prior Publication Data

US 2015/0341058 A1  Nov. 26, 2015

Related U.S. Application Data

(63) Continuation-in-part of application No. 14/681,725, filed on Apr. 8, 2015.

(Continued)

(51) Int. Cl.
*H04B 1/00* (2006.01)
*H04B 7/08* (2006.01)
(Continued)

(52) U.S. Cl.
CPC ............ *H04B 7/01* (2013.01); *H04B 1/0057* (2013.01); *H04B 1/18* (2013.01); *H04B 1/58* (2013.01); *H04B 7/0837* (2013.01)

(58) Field of Classification Search
CPC .......... H04B 1/0057; H04B 1/18; H04B 7/01; H04B 7/0837

See application file for complete search history.

(56) References Cited

U.S. PATENT DOCUMENTS 6,167,286 A     12/2000  Ward et al.
8,149,742 B1 *  4/2012   Sorsby ................ H04B 1/0057
                                               370/219

(Continued)

OTHER PUBLICATIONS

Non-Final Office Action for U.S. Appl. No. 14/681,725, dated Apr. 24, 2017, 12 pages.

*Primary Examiner* — Ayaz Sheikh
*Assistant Examiner* — Debebe Asefa
(74) *Attorney, Agent, or Firm* — Withrow & Terranova, P.L.L.C.

(57) ABSTRACT

A reconfigurable RF receive diplexer, which includes a first hybrid RF coupler, a second hybrid RF coupler, and reconfigurable RF filter circuitry, is disclosed. The reconfigurable RF receive diplexer receives a first adjunct RF antenna receive signal via a first isolation port to provide a first adjunct RF receive signal via a second main port. The reconfigurable RF receive diplexer further receives a first RF transmit signal via a first main port to provide a first RF antenna transmit signal via the first isolation port. The reconfigurable RF receive diplexer operates in each of a group of operating modes, such that during a first operating mode, a carrier frequency of the first adjunct RF antenna receive signal is within a first RF communications band; and during a second operating mode, a carrier frequency of the first adjunct RF antenna receive signal is within a second RF communications band.

20 Claims, 17 Drawing Sheets

Related U.S. Application Data

(60) Provisional application No. 61/976,958, filed on Apr. 8, 2014, provisional application No. 62/033,880, filed on Aug. 6, 2014.

(51) Int. Cl.
*H04B 7/01* (2006.01)
*H04B 1/18* (2006.01)
*H04B 1/58* (2006.01)

(56) References Cited

U.S. PATENT DOCUMENTS

| | | |
|---|---|---|
| 9,042,275 B2 | 5/2015 | Bauder et al. |
| 9,048,805 B2 | 6/2015 | Granger-Jones et al. |
| 9,071,430 B2 | 6/2015 | Bauder et al. |
| 9,083,518 B2 | 7/2015 | Bauder et al. |
| 2010/0102899 A1* | 4/2010 | Engel ............... H01P 1/211 |
| | | 333/117 |
| 2010/0261442 A1 | 10/2010 | Paculdo |
| 2015/0288389 A1 | 10/2015 | Khlat et al. |

\* cited by examiner

RECONFIGURABLE RF RECEIVE DIPLEXER

RELATED APPLICATIONS

The present application claims the benefit of and is a continuation-in-part of U.S. patent application Ser. No. 14/681,725, filed Apr. 8, 2015, entitled "RF RECEIVE DIPLEXER," which claims the benefit of U.S. provisional patent applications no. 61/976,958, filed Apr. 8, 2014, and No. 62/033,880, filed Aug. 6, 2014. Additionally, the present application claims the benefit of U.S. provisional patent application No. 62/033,880, filed Aug. 6, 2014.

All of the applications listed above are hereby incorporated herein by reference in their entireties

FIELD OF THE DISCLOSURE

Embodiments of the present disclosure relate to radio frequency (RF) communications systems, which may include RF front-end circuitry, RF transceiver circuitry, RF transmit circuitry, RF receive circuitry, RF diplexers, RF duplexers, RF filters, RF antennas, RF switches, RF combiners, RF splitters, the like, or any combination thereof.

BACKGROUND

As wireless communications technologies evolve, wireless communications systems become increasingly sophisticated. As such, wireless communications protocols continue to expand and change to take advantage of the technological evolution. As a result, to maximize flexibility, many wireless communications devices must be capable of supporting any number of wireless communications protocols, each of which may have certain performance requirements, such as specific out-of-band emissions requirements, linearity requirements, or the like. Further, portable wireless communications devices are typically battery powered and need to be relatively small, and have low cost. As such, to minimize size, cost, and power consumption, RF circuitry in such a device needs to be as simple, small, flexible, and efficient as is practical. Thus, there is a need for RF circuitry in a communications device that is low cost, small, simple, flexible, and efficient.

SUMMARY

A reconfigurable RF receive diplexer, which includes a first hybrid RF coupler, a second hybrid RF coupler, and reconfigurable RF filter circuitry, is disclosed according to one embodiment of the present disclosure. The first hybrid RF coupler has a first main port, a first pair of quadrature ports, and a first isolation port. The second hybrid RF coupler has a second main port and a second pair of quadrature ports. The reconfigurable RF filter circuitry is coupled between the first pair of quadrature ports and the second pair of quadrature ports. The reconfigurable RF receive diplexer receives a first adjunct RF antenna receive signal via the first isolation port to provide a first adjunct RF receive signal via the second main port. The reconfigurable RF receive diplexer receives a first RF transmit signal via the first main port to provide a first RF antenna transmit signal via the first isolation port. The reconfigurable RF receive diplexer operates in each of a group of operating modes, such that during a first operating mode, a carrier frequency of the first adjunct RF antenna receive signal is within a first RF communications band; and during a second operating mode, a carrier frequency of the first adjunct RF antenna receive signal is within a second RF communications band.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

A reconfigurable RF receive diplexer, which includes a first hybrid RF coupler, a second hybrid RF coupler, and reconfigurable RF filter circuitry, is disclosed according to one embodiment of the present disclosure. The first hybrid RF coupler has a first main port, a first pair of quadrature ports, and a first isolation port. The second hybrid RF coupler has a second main port and a second pair of quadrature ports. The reconfigurable RF filter circuitry is coupled between the first pair of quadrature ports and the second pair of quadrature ports. The reconfigurable RF receive diplexer receives a first adjunct RF antenna receive signal via the first isolation port to provide a first adjunct RF receive signal via the second main port. The reconfigurable RF receive diplexer receives a first RF transmit signal via the first main port to provide a first RF antenna transmit signal via the first isolation port. The reconfigurable RF receive diplexer operates in each of a group of operating modes, such that during a first operating mode, a carrier frequency of the first adjunct RF antenna receive signal is within a first RF communications band; and during a second operating mode, a carrier frequency of the first adjunct RF antenna receive signal is within a second RF communications band.

A first RF receive diplexer, which includes a first hybrid RF coupler, a second hybrid RF coupler, and RF filter circuitry, is disclosed according to an alternate embodiment of the present disclosure. The first hybrid RF coupler has a first main port, a first pair of quadrature ports, and a first isolation port, which is coupled to an RF antenna. The second hybrid RF coupler has a second main port and a second pair of quadrature ports. The RF filter circuitry is coupled between the first pair of quadrature ports and the second pair of quadrature ports. The first RF receive diplexer receives a first adjunct RF antenna receive signal via the first isolation port to provide a first adjunct RF receive signal via the second main port. The first RF receive diplexer receives a first RF transmit signal via the first main port to provide a first RF antenna transmit signal via the first isolation port.

Figure 1:
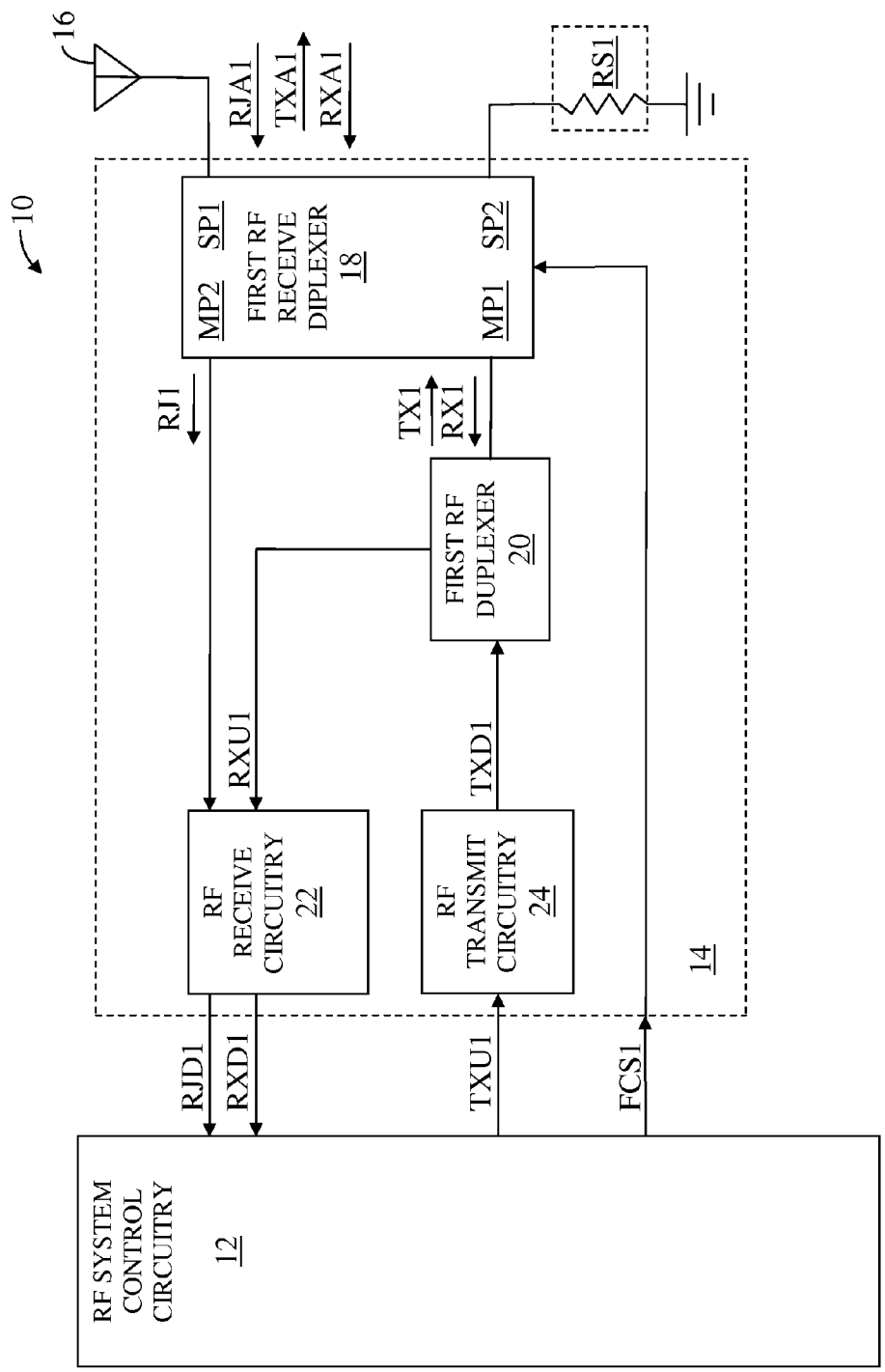
FIG. 1 shows RF communications circuitry according to one embodiment of the RF communications circuitry.

FIG. 1 shows RF communications circuitry 10 according to one embodiment of the RF communications circuitry 10. The RF communications circuitry 10 includes RF system control circuitry 12, RF front-end circuitry 14, a first RF antenna 16, and a first isolation port resistive element RS1. The RF front-end circuitry 14 includes a first RF receive diplexer 18, a first RF duplexer 20, RF receive circuitry 22, and RF transmit circuitry 24. The first RF receive diplexer 18 has a first main port MP1, a second main port MP2, a first isolation port SP1, and a second isolation port SP2. The first main port MP1 is coupled to the first RF duplexer 20. The second main port MP2 is coupled to the RF receive circuitry 22. The first isolation port SP1 is coupled to the first RF antenna 16. The first isolation port resistive element RS1 is coupled between the second isolation port SP2 and ground. The RF system control circuitry 12 provides a first function configuration signal FCS1 to the first RF receive diplexer 18.

In one embodiment of the RF system control circuitry 12, the RF system control circuitry 12 provides a first upstream RF transmit signal TXU1 to the RF transmit circuitry 24, which processes the first upstream RF transmit signal TXU1 to provide a first downstream RF transmit signal TXD1 to the first RF duplexer 20.

The RF transmit circuitry 24 may include up-conversion circuitry, amplification circuitry, power supply circuitry, filtering circuitry, switching circuitry, combining circuitry, splitting circuitry, dividing circuitry, clocking circuitry, the like, or any combination thereof to process the first upstream RF transmit signal TXU1.

In one embodiment of the RF receive circuitry 22, the RF receive circuitry 22 receives and processes a first adjunct RF receive signal RJ1 to provide a first downstream adjunct RF receive signal RJD1 to the RF system control circuitry 12. Additionally, in one embodiment of the RF receive circuitry 22, the RF receive circuitry 22 receives and processes a first upstream RF receive signal RXU1 to provide a first downstream RF receive signal RXD1 to the RF system control circuitry 12. The first RF duplexer 20 provides the first upstream RF receive signal RXU1 to the RF receive circuitry 22. In an alternate embodiment of the RF receive circuitry 22, the first upstream RF receive signal RXU1 and the first downstream RF receive signal RXD1 are omitted.

In an additional embodiment of the RF receive circuitry 22, the RF receive circuitry 22 simultaneously receives and processes the first upstream RF receive signal RXU1 and the first adjunct RF receive signal RJ1, respectively, to provide the first downstream RF receive signal RXD1 and the first downstream adjunct RF receive signal RJD1, respectively.

In one embodiment of the RF receive circuitry 22, the RF receive circuitry 22 supports receive downlink carrier aggregation (RXDLCA) by simultaneously receiving and processing the first upstream RF receive signal RXU1 and the first adjunct RF receive signal RJ1. The RF receive circuitry 22 may include down-conversion circuitry, amplification circuitry, low noise amplification circuitry, power supply circuitry, filtering circuitry, switching circuitry, combining circuitry, splitting circuitry, dividing circuitry, clocking circuitry, the like, or any combination thereof.

In one embodiment of the RF front-end circuitry 14, any or all of the first upstream RF transmit signal TXU1, the first downstream RF transmit signal TXD1, the first upstream RF receive signal RXU1, the first downstream RF receive signal RXD1, the first adjunct RF receive signal RJ1, and the first downstream adjunct RF receive signal RJD1 are omitted.

An RF duplexer is a well-known RF device in the art having a common port (not shown), a transmit signal port (not shown), and a receive signal port (not shown). Combined RF receive and transmit signals at the common port are separated into an RF receive signal at the receive signal port and an RF transmit signal at the transmit signal port. The RF duplexer is used to at least partially isolate the receive signal port from the RF transmit signal to help receive performance by avoiding receiver de-sensitization of RF receive circuitry by the RF transmit signal. The RF transmit signal and the RF receive signal are separated by a duplex frequency. Additionally, the RF transmit signal and the RF receive signal fall within one respective RF communications band.

The first RF duplexer 20 receives and provides a first RF receive signal RX1 and a first RF transmit signal TX1, respectively. In one embodiment of the first RF duplexer 20, the first RF duplexer 20 receives and provides the first RF receive signal RX1 and the first RF transmit signal TX1 simultaneously. In one embodiment of the first RF duplexer 20, the first RF receive signal RX1 and the first RF transmit signal TX1 are not received and provided simultaneously. In one embodiment of the first RF duplexer 20, the first RF receive signal RX1 is omitted. In one embodiment of the first RF duplexer 20, the first RF transmit signal TX1 is omitted. In one embodiment of the first RF duplexer 20, both the first RF receive signal RX1 and the first RF transmit signal TX1 are omitted. In one embodiment of the RF communications circuitry 10, the first RF duplexer 20 is omitted.

In one embodiment of the first RF duplexer 20, the first RF duplexer 20 receives and forwards the first RF receive signal RX1 to provide the first upstream RF receive signal RXU1. In one embodiment of the first RF duplexer 20, the first RF duplexer 20 receives and forwards the first downstream RF transmit signal TXD1 to provide the first RF transmit signal TX1. In one embodiment of the first RF duplexer 20, the first RF duplexer 20 at least partially isolates the first downstream RF transmit signal TXD1 and the first RF transmit signal TX1 from the RF receive circuitry 22.

As previously mentioned, the first RF receive diplexer 18 has the first main port MP1, and the second main port MP2. The first isolation port SP1 is coupled to the first RF antenna 16. The first main port MP1 is coupled to the first RF duplexer 20. The second main port MP2 is coupled to the RF receive circuitry 22. In general, in one embodiment of the first RF receive diplexer 18, the first RF receive diplexer 18 separates combined RF signals at the first isolation port SP1 into separate RF signals at each of the first main port MP1 and the second main port MP2. In one embodiment of the first RF receive diplexer 18, RF signals at the first main port MP1 are associated with one RF communications band, and RF signals at the second main port MP2 are associated with another RF communications band. Therefore, RF signals at the first isolation port SP1 may be associated with both RF communications bands.

By segregating the RF signals in this manner, processing of the RF signals may be simplified, may enhance RF performance, or both. In one embodiment of the first RF receive diplexer 18, the first main port MP1 is substantially isolated from the second main port MP2. The first RF receive diplexer 18 receives and forwards the first RF transmit signal TX1 via the first main port MP1 to the first isolation port SP1 to provide a first RF antenna transmit signal TXA1.

The first RF receive diplexer 18 receives and forwards a first RF antenna receive signal RXA1 via the first RF antenna 16 to the first main port MP1 to provide the first RF receive signal RX1. As such, the first RF receive diplexer 18 receives the first RF antenna receive signal RXA1 via the first isolation port SP1 to provide the first RF receive signal RX1 via the first main port MP1. Additionally, the first RF receive diplexer 18 receives and forwards a first adjunct RF antenna receive signal RJA1 via the first RF antenna 16 and the first isolation port SP1 to the second main port MP2 to provide the first adjunct RF receive signal RJ1. In one embodiment of the first RF receive diplexer 18, the first RF receive diplexer 18 establishes RXDLCA by receiving the first RF antenna receive signal RXA1 and the first adjunct RF antenna receive signal RJA1 simultaneously. As such, the first RF antenna receive signal RXA1 and the first adjunct RF antenna receive signal RJA1 are RXDLCA signals. Therefore, the first RF receive signal RX1 and the first adjunct RF receive signal RJ1 are carrier aggregation RF receive signals. In one embodiment of the first RF receive diplexer 18, the first RF receive diplexer 18 receives the first RF transmit signal TX1 and the first adjunct RF antenna receive signal RJA1 simultaneously.

In one embodiment of the RF front-end circuitry 14, any or all of the first RF transmit signal TX1, the first RF antenna transmit signal TXA1, the first RF receive signal RX1, the first RF antenna receive signal RXA1, the first adjunct RF receive signal RJ1, and the first RF antenna receive signal RXA1 are omitted.

In one embodiment of the RF system control circuitry 12 and the first RF receive diplexer 18, the RF system control circuitry 12 provides the first function configuration signal FCS1 to the first RF receive diplexer 18. As such, the RF system control circuitry 12 may configure, tune, adjust, enable, disable, vary, or any combination thereof, circuits within the first RF receive diplexer 18 as necessary using the first function configuration signal FCS1.

Figure 2:
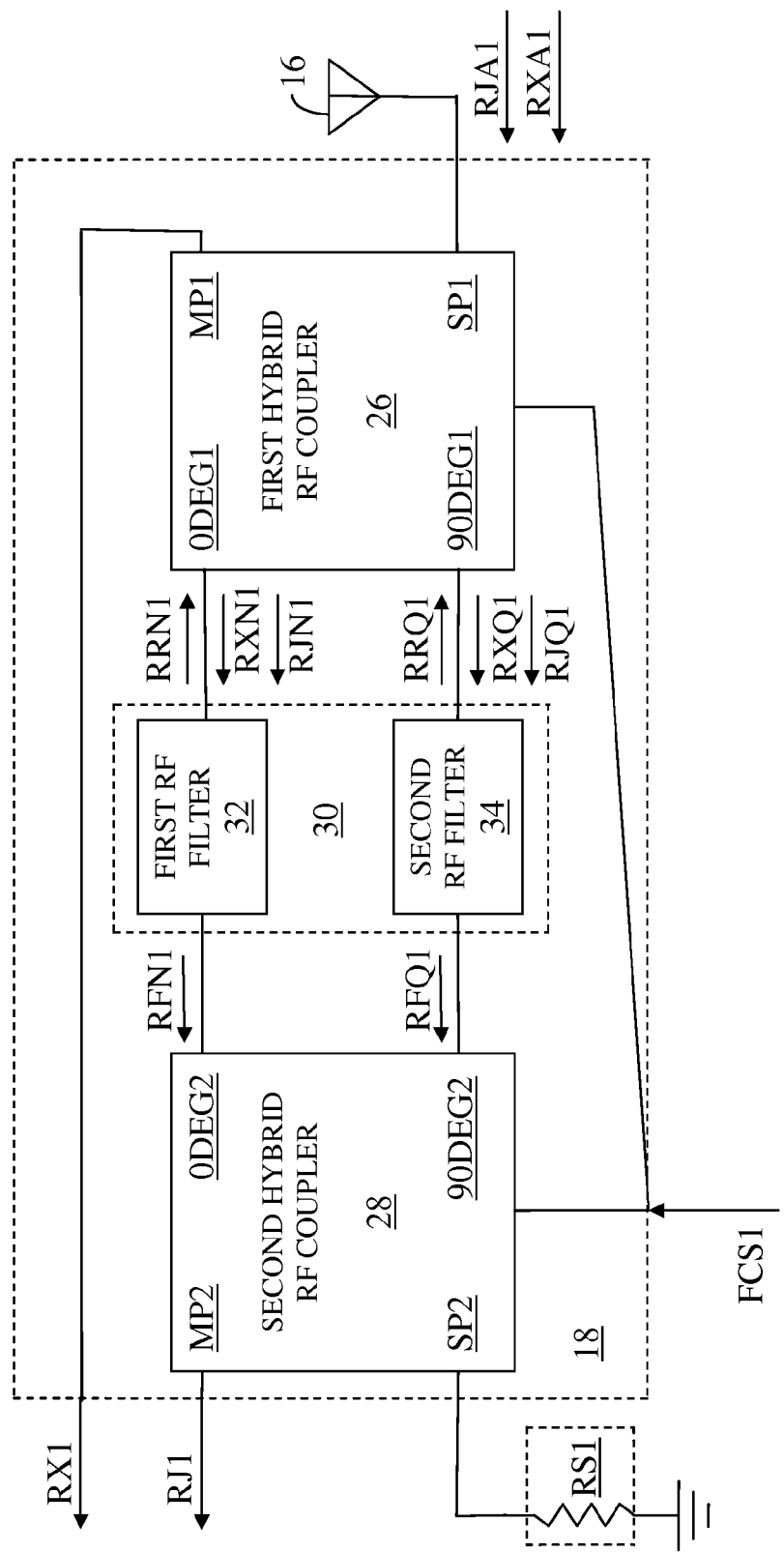
FIG. 2 shows details of a first RF receive diplexer, a first RF antenna, and a first isolation port resistive element illustrated in FIG. 1 according to one embodiment of the first RF receive diplexer, the first RF antenna, and the first isolation port resistive element.

FIG. 2 shows details of the first RF receive diplexer 18, the first RF antenna 16, and the first isolation port resistive element RS1 illustrated in FIG. 1 according to one embodiment of the first RF receive diplexer 18, the first RF antenna 16, and the first isolation port resistive element RS1. The first RF receive diplexer 18 includes a first hybrid RF coupler 26, a second hybrid RF coupler 28, and RF filter circuitry 30, which includes a first RF filter 32 and a second RF filter 34.

The first hybrid RF coupler 26 has the first main port MP1, a first in-phase port 0DEG1, a first quadrature-phase port 90DEG1, and the first isolation port SP1. The first isolation port SP1 is coupled to the first RF antenna 16. The second hybrid RF coupler 28 has the second main port MP2, a second in-phase port 0DEG2, a second quadrature-phase port 90DEG2, and the second isolation port SP2. The first isolation port resistive element RS1 is coupled between the second isolation port SP2 and ground. The first in-phase port 0DEG1 and the first quadrature-phase port 90DEG1 provide a first pair of quadrature ports. The second in-phase port 0DEG2 and the second quadrature-phase port 90DEG2 provide a second pair of quadrature ports.

The RF filter circuitry 30 is coupled between the first pair of quadrature ports and the second pair of quadrature ports. As such, the first RF filter 32 is coupled between the first in-phase port 0DEG1 and the second in-phase port 0DEG2. The second RF filter 34 is coupled between the first quadrature-phase port 90DEG1 and the second quadrature-phase port 90DEG2.

In one embodiment of the first isolation port resistive element RS1, the first isolation port resistive element RS1 is adjusted to compensate for an impedance mismatch between the first RF antenna 16 and the first isolation port SP1.

The first hybrid RF coupler 26 receives, splits, and phase-shifts a first RF antenna receive signal RXA1 via the first isolation port SP1, to provide a first in-phase RF receive signal RXN1 via the first in-phase port 0DEG1, and further provide a first quadrature-phase RF receive signal RXQ1 via the first quadrature-phase port 90DEG1. In general, the first in-phase RF receive signal RXN1 and the first quadrature-phase RF receive signal RXQ1 are provided to the RF filter circuitry 30. Additionally, the first hybrid RF coupler 26 receives, splits, and phase-shifts a first adjunct RF antenna receive signal RJA1 via the first isolation port SP1, to provide a first adjunct in-phase RF receive signal RJN1 via the first in-phase port 0DEG1, and further provide a first adjunct quadrature-phase RF receive signal RJQ1 via the first quadrature-phase port 90DEG1.

The first RF filter 32 and the second RF filter 34 each present a substantially high impedance to the first in-phase RF receive signal RXN1 and the first quadrature-phase RF receive signal RXQ1, respectively. As a result, the first in-phase RF receive signal RXN1 and the first quadrature-phase RF receive signal RXQ1 are substantially reflected by the first RF filter 32 and the second RF filter 34, respectively, to provide a first reflected in-phase RF receive signal RRN1 and a first reflected quadrature-phase RF receive signal RRQ1, respectively. In general, the RF filter circuitry 30 presents a substantially high impedance to the first in-phase RF receive signal RXN1 and the first quadrature-phase RF receive signal RXQ1. As such, in general, the first in-phase RF receive signal RXN1 and the first quadrature-phase RF receive signal RXQ1 are substantially reflected by the RF filter circuitry 30 to provide the first reflected in-phase RF receive signal RRN1 and the first reflected quadrature-phase RF receive signal RRQ1 to the first hybrid RF coupler 26.

The first hybrid RF coupler 26 receives, phase-shifts, and then combines the first reflected in-phase RF receive signal RRN1 and the first reflected quadrature-phase RF receive signal RRQ1, respectively, via the first in-phase port 0DEG1 and the first quadrature-phase port 90DEG1, respectively, to provide the first RF receive signal RX1 via the first main port MP1.

The first RF filter 32 receives and filters the first adjunct in-phase RF receive signal RJN1 to provide a first filtered in-phase RF receive signal RFN1. The second RF filter 34 receives and filters the first adjunct quadrature-phase RF receive signal RJQ1 to provide a first filtered quadrature-phase RF receive signal RFQ1.

The second hybrid RF coupler 28 receives, phase-shifts, and then combines the first filtered in-phase RF receive signal RFN1 and the first filtered quadrature-phase RF receive signal RFQ1, respectively, via the second in-phase port 0DEG2 and the second quadrature-phase port 90DEG2, respectively, to provide the first adjunct RF receive signal RJ1 via the second main port MP2. In one embodiment of the first RF receive diplexer 18, the first RF receive diplexer 18 receives the first adjunct RF antenna receive signal RJA1 and the first RF antenna receive signal RXA1 simultaneously, such that the first adjunct RF antenna receive signal RJA1 and the first RF antenna receive signal RXA1 are carrier aggregation RF receive signals.

In one embodiment of the first RF filter 32, a filter response of the first RF filter 32 to RF signals received from the first in-phase port 0DEG1 is approximately equal to a filter response of the first RF filter 32 to RF signals received from the second in-phase port 0DEG2, such that the first RF filter 32 has an approximately symmetrical filter response. In one embodiment of the second RF filter 34, a filter response of the second RF filter 34 to RF signals received from the first quadrature-phase port 90DEG1 is approximately equal to a filter response of the second RF filter 34 to RF signals received from the second quadrature-phase port 90DEG2, such that the second RF filter 34 has an approximately symmetrical filter response.

The first hybrid RF coupler 26 and the second hybrid RF coupler 28 both receive the first function configuration signal FCS1. In one embodiment of the first hybrid RF coupler 26 and the second hybrid RF coupler 28, either the first hybrid RF coupler 26, the second hybrid RF coupler 28, or both may be adjusted for a desired phase-shift, desired magnitude, or both between each of the first pair of quadrature ports, between each of the second pair of quadrature ports, or both.

Figure 3:
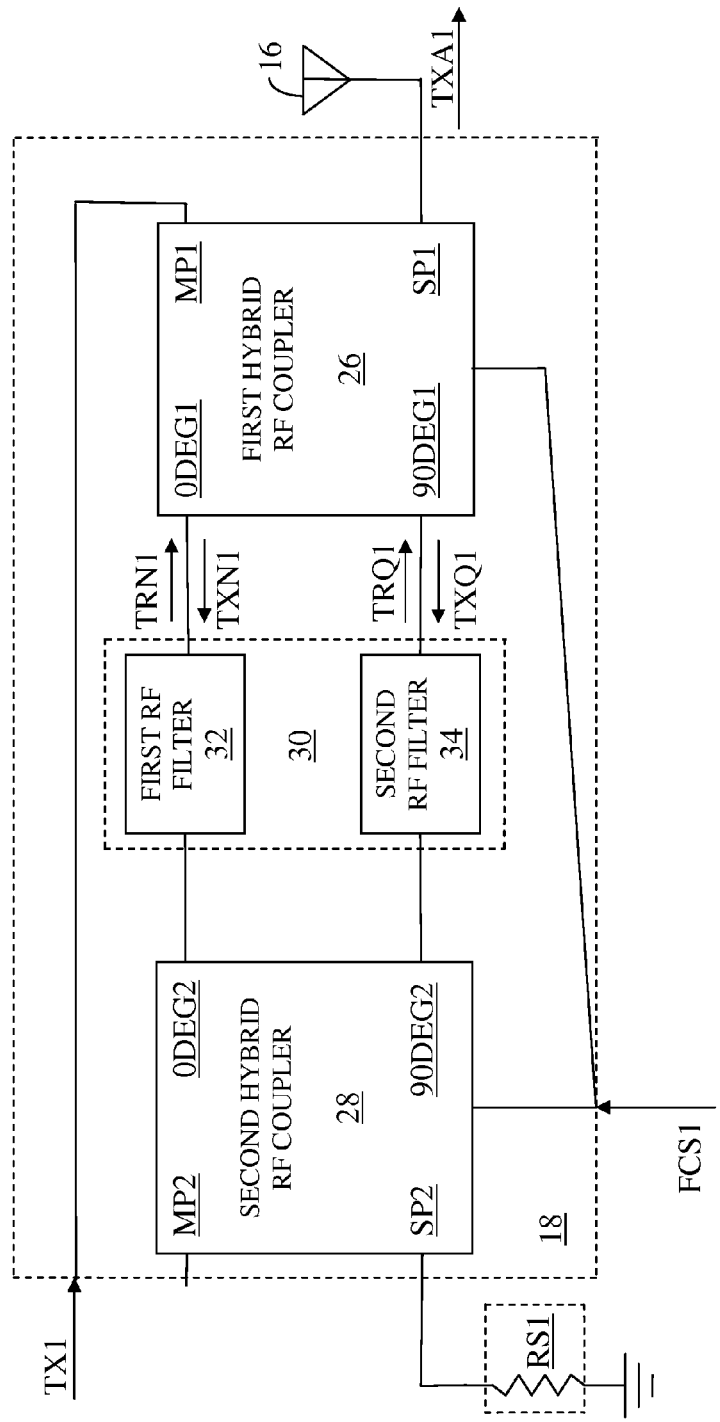
FIG. 3 shows details of the first RF receive diplexer, the first RF antenna, and the first isolation port resistive element illustrated in FIG. 1 according to an alternate embodiment of the first RF receive diplexer, the first RF antenna, and the first isolation port resistive element.

FIG. 3 shows details of the first RF receive diplexer 18, the first RF antenna 16, and the first isolation port resistive element RS1 illustrated in FIG. 1 according to an alternate embodiment of the first RF receive diplexer 18, the first RF antenna 16, and the first isolation port resistive element RS1. The first RF receive diplexer 18, the first RF antenna 16, and the first isolation port resistive element RS1 illustrated in FIG. 3 are similar to the first RF receive diplexer 18, the first RF antenna 16, and the first isolation port resistive element RS1 illustrated in FIG. 2, except in the first RF receive diplexer 18 illustrated in FIG. 3, the first RF receive diplexer 18 is used to transmit the first RF antenna transmit signal TXA1 using the first RF antenna 16.

As such, the first hybrid RF coupler 26 receives the first RF transmit signal TX1 via the first main port MP1. The first hybrid RF coupler 26 receives, splits, and phase-shifts the first RF transmit signal TX1 to provide a first in-phase RF transmit signal TXN1 via the first in-phase port 0DEG1 and further provide a first quadrature-phase RF transmit signal TXQ1 via the first quadrature-phase port 90DEG1. In general, the first in-phase RF transmit signal TXN1 and the first quadrature-phase RF transmit signal TXQ1 are provided to the RF filter circuitry 30, which substantially reflects the first in-phase RF transmit signal TXN1 and the first quadrature-phase RF transmit signal TXQ1.

The first RF filter 32 and the second RF filter 34 each present a substantially high impedance to the first in-phase RF transmit signal TXN1 and the first quadrature-phase RF transmit signal TXQ1, respectively. As a result, the first in-phase RF transmit signal TXN1 and the first quadrature-phase RF transmit signal TXQ1 are substantially reflected by the first RF filter 32 and the second RF filter 34, respectively, to provide a first reflected in-phase RF transmit signal TRN1 and a first reflected quadrature-phase RF transmit signal TRQ1, respectively. The first hybrid RF coupler 26 receives, phase-shifts, and then combines the first reflected in-phase RF transmit signal TRN1 and the first reflected quadrature-phase RF transmit signal TRQ1, respectively, via the first in-phase port 0DEG1 and the first quadrature-phase port 90DEG1, respectively, to provide the first RF antenna transmit signal TXA1 via the first isolation port SP1.

In one embodiment of the second hybrid RF coupler 28, any of the first in-phase RF transmit signal TXN1 and the first quadrature-phase RF transmit signal TXQ1 that is allowed through the RF filter circuitry 30 is substantially, received, phase-shifted, and cancelled by the second hybrid RF coupler 28, thereby increasing isolation between the first main port MP1 and the second main port MP2. In one embodiment of the second hybrid RF coupler 28, the second hybrid RF coupler 28 is a tunable hybrid RF coupled, such that a magnitude, a phase-shift, or both that is applied to the residual of the first in-phase RF transmit signal TXN1 and the first quadrature-phase RF transmit signal TXQ1 that is allowed through the RF filter circuitry 30 is adjustable based on the first function configuration signal FCS1.

In one embodiment of the first hybrid RF coupler 26, the first hybrid RF coupler 26 is a tunable hybrid RF coupler, such that the first hybrid RF coupler 26 is tuned based on the first function configuration signal FCS1. As such, a magnitude, a phase-shift, or both that is applied to the first in-phase RF transmit signal TXN1 and the first quadrature-phase RF transmit signal TXQ1 is adjustable based on the first function configuration signal FCS1.

Figure 4:
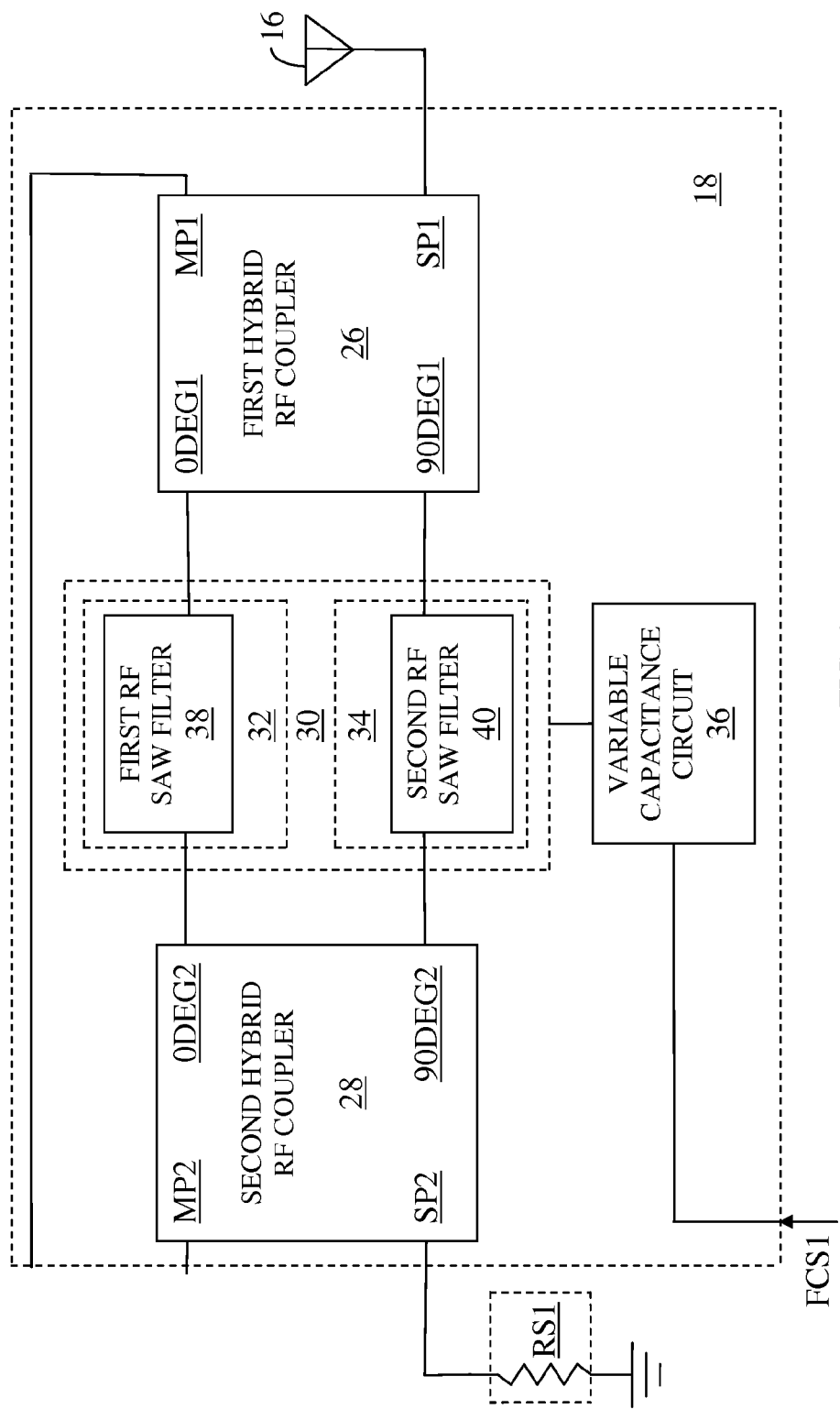
FIG. 4 shows details of the first RF receive diplexer, the first RF antenna, and the first isolation port resistive element illustrated in FIG. 1 according to an additional embodiment of the first RF receive diplexer, the first RF antenna, and the first isolation port resistive element.

FIG. 4 shows details of the first RF receive diplexer 18, the first RF antenna 16, and the first isolation port resistive element RS1 illustrated in FIG. 1 according to an additional embodiment of the first RF receive diplexer 18, the first RF antenna 16, and the first isolation port resistive element RS1. The first RF receive diplexer 18, the first RF antenna 16, and the first isolation port resistive element RS1 illustrated in FIG. 4 are similar to the first RF receive diplexer 18, the first RF antenna 16, and the first isolation port resistive element RS1 illustrated in FIG. 2, except in the first RF receive diplexer 18 illustrated in FIG. 4, the first RF receive diplexer 18 further includes a variable capacitance circuit 36, the first RF filter 32 includes a first RF surface acoustic wave (SAW) filter 38, and the second RF filter 34 includes a second RF SAW filter 40.

In general, the first RF SAW filter 38 and the second RF SAW filter 40 provide SAW RF filter circuitry coupled between the first pair of quadrature ports and the second pair of quadrature ports. The variable capacitance circuit 36 provides at least one variable capacitance to the SAW RF filter circuitry. As such, filtering characteristics of the RF filter circuitry 30 are based on at least the one variable capacitance, which is based on the first function configuration signal FCS1. In an alternate embodiment of the first RF receive diplexer 18, the variable capacitance circuit 36 is omitted.

Figure 5:
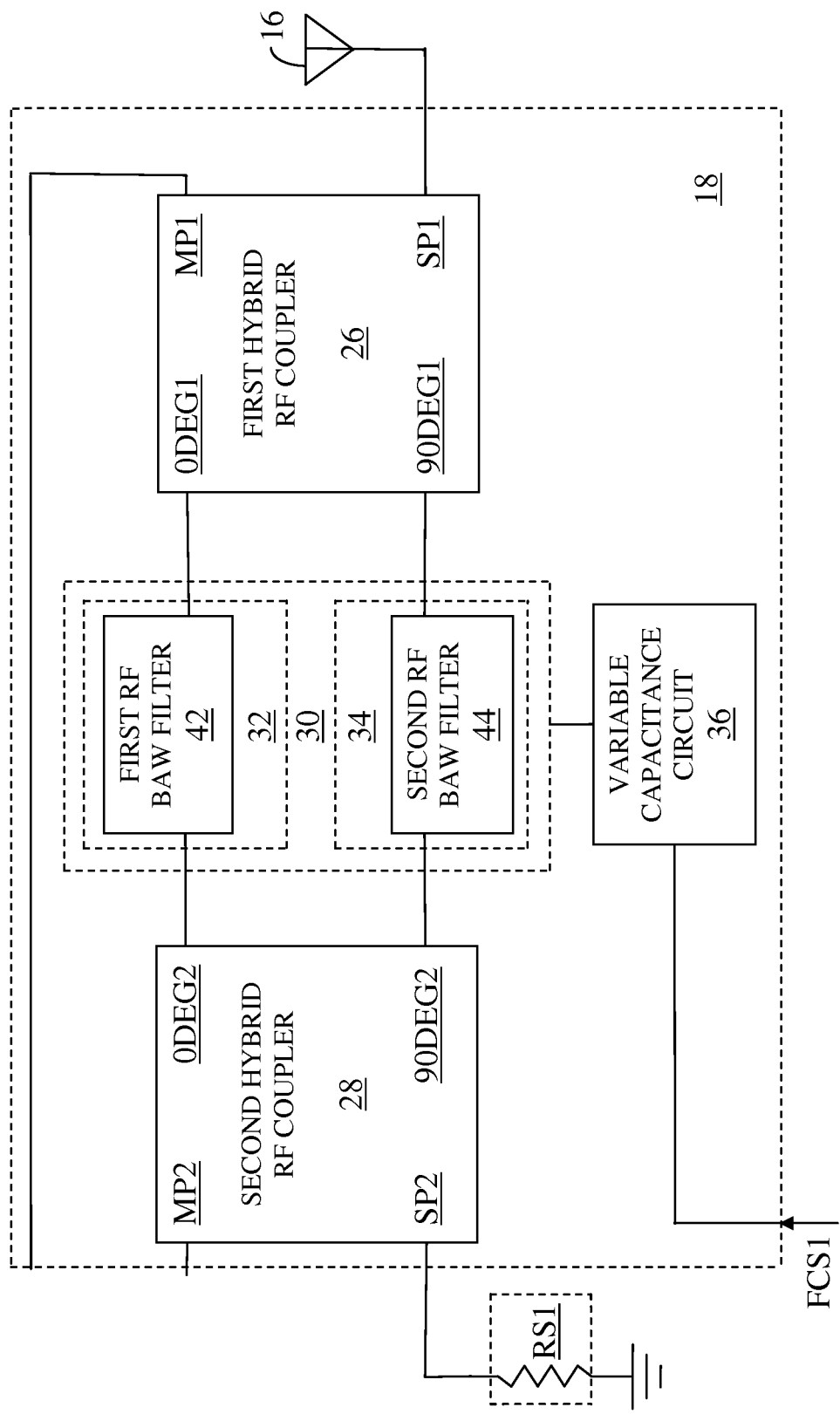
FIG. 5 shows details of the first RF receive diplexer, the first RF antenna, and the first isolation port resistive element illustrated in FIG. 1 according to another embodiment of the first RF receive diplexer, the first RF antenna, and the first isolation port resistive element.

FIG. 5 shows details of the first RF receive diplexer 18, the first RF antenna 16, and the first isolation port resistive element RS1 illustrated in FIG. 1 according to another embodiment of the first RF receive diplexer 18, the first RF antenna 16, and the first isolation port resistive element RS1. The first RF receive diplexer 18, the first RF antenna 16, and the first isolation port resistive element RS1 illustrated in FIG. 5 are similar to the first RF receive diplexer 18, the first RF antenna 16, and the first isolation port resistive element RS1 illustrated in FIG. 2, except in the first RF receive diplexer 18 illustrated in FIG. 5, the first RF receive diplexer 18 further includes the variable capacitance circuit 36, the first RF filter 32 includes a first RF bulk acoustic wave (BAW) filter 42, and the second RF filter 34 includes a second RF BAW filter 44.

In general, the first RF BAW filter 42 and the second RF BAW filter 44 provide BAW RF filter circuitry coupled between the first pair of quadrature ports and the second pair of quadrature ports. The variable capacitance circuit 36 provides at least one variable capacitance to the BAW RF filter circuitry. As such, filtering characteristics of the RF filter circuitry 30 are based on at least the one variable capacitance, which is based on the first function configuration signal FCS1. In an alternate embodiment of the first RF receive diplexer 18, the variable capacitance circuit 36 is omitted.

Figure 6:
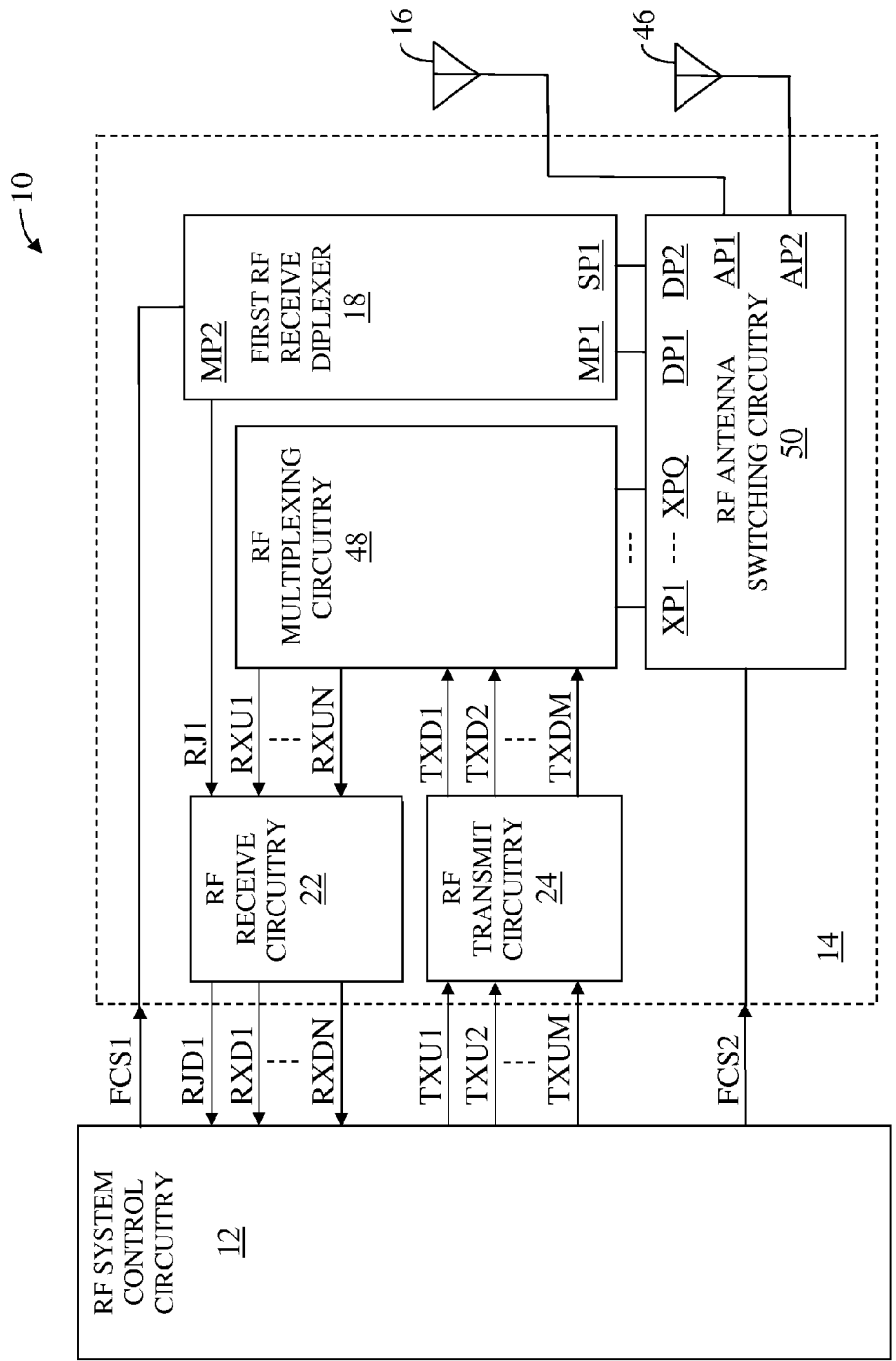
FIG. 6 shows the RF communications circuitry according to one embodiment of the RF communications circuitry.

FIG. 6 shows the RF communications circuitry 10 according to one embodiment of the RF communications circuitry 10. The RF communications circuitry 10 illustrated in FIG. 6 is similar to the RF communications circuitry 10 illustrated in FIG. 1, except in the RF communications circuitry 10 illustrated in FIG. 6, the RF communications circuitry 10 further includes a second RF antenna 46, the first RF duplexer 20 is omitted, and the RF front-end circuitry 14 further includes RF multiplexing circuitry 48 and RF antenna switching circuitry 50.

The RF antenna switching circuitry 50 has a first RF antenna port AP1, a second RF antenna port AP2, a first RF diplexer port DP1, a second RF diplexer port DP2, a first RF multiplexer port XP1, and up to and including a $Q^{TH}$ RF multiplexer port XPQ. The first RF antenna 16 is coupled to the first RF antenna port AP1. The second RF antenna 46 is coupled to the second RF antenna port AP2. The first main port MP1 is coupled to the first RF diplexer port DP1. The first isolation port SP1 is coupled to the second RF diplexer port DP2. The RF multiplexer ports XP1, XPQ are coupled to the RF multiplexing circuitry 48.

In general, the RF antenna switching circuitry 50 provides connectivity between the RF antennas 16, 46, the first RF receive diplexer 18, and the RF multiplexing circuitry 48. The second RF diplexer port DP2 provides connectivity between the first RF receive diplexer 18 and the RF antennas 16, 46 using the RF antenna switching circuitry 50. The first RF diplexer port DP1 provides connectivity between the first RF receive diplexer 18 and the RF multiplexing circuitry 48 using the RF antenna switching circuitry 50. Further, the RF antenna switching circuitry 50 provides connectivity between the RF multiplexing circuitry 48 and the RF antennas 16, 46. The RF system control circuitry 12 provides a second function configuration signal FCS2 to the RF antenna switching circuitry 50, such that switching configurations of the RF antenna switching circuitry 50 are based on the second function configuration signal FCS2.

The RF multiplexing circuitry 48 provides the first upstream RF receive signal RXU1 and up to and including an $N^{TH}$ upstream RF receive signal RXUN to the RF receive circuitry 22, which processes the upstream RF receive signals RXU1, RXUN to provide a downstream RF receive signals RXD1, RXDN to the RF system control circuitry 12. In alternate embodiments of the RF multiplexing circuitry 48, any of the RF receive signals RXU1, RXUN, RXD1, RXDN may be omitted.

Similarly, the RF system control circuitry 12 provides the first upstream RF transmit signal TXU1, a second upstream RF transmit signal TXU2, and up to and including an $M^{TH}$ upstream RF transmit signal TXUM to the RF transmit circuitry 24. The RF transmit circuitry 24 processes the upstream RF transmit signals TXU1, TXU2, TXUM to provide downstream RF transmit signals TXD1, TXD2, TXDM to the RF multiplexing circuitry 48. In alternate embodiments of the RF system control circuitry 12, any of the RF transmit signals TXU1, TXU2, TXUN, TXD1, TXD2, TXDN may be omitted.

In one embodiment of the RF front-end circuitry 14, the first RF receive diplexer 18 and the RF multiplexing circuitry 48 combine to provide multiplexing functionality. As such, by providing the first adjunct RF receive signal RJ1, the first RF receive diplexer 18 adds one level of multiplexing to the RF multiplexing circuitry 48. As such, in a first embodiment of the RF multiplexing circuitry 48, the RF multiplexing circuitry 48 functions as an RF duplexer. Therefore, a combination of the RF multiplexing circuitry 48 and the first RF receive diplexer 18 functions as an RF triplexer.

In a second embodiment of the RF multiplexing circuitry 48, the RF multiplexing circuitry 48 functions as an RF triplexer. Therefore, the combination of the RF multiplexing circuitry 48 and the first RF receive diplexer 18 functions as an RF quadplexer. In a third embodiment of the RF multiplexing circuitry 48, the RF multiplexing circuitry 48 functions as an RF quadplexer. Therefore, the combination of the RF multiplexing circuitry 48 and the first RF receive diplexer 18 functions as an RF quintplexer. In a fourth embodiment of the RF multiplexing circuitry 48, the RF multiplexing circuitry 48 functions as an RF quintplexer. Therefore, the combination of the RF multiplexing circuitry 48 and the first RF receive diplexer 18 functions as an RF hexplexer.

Figure 7:
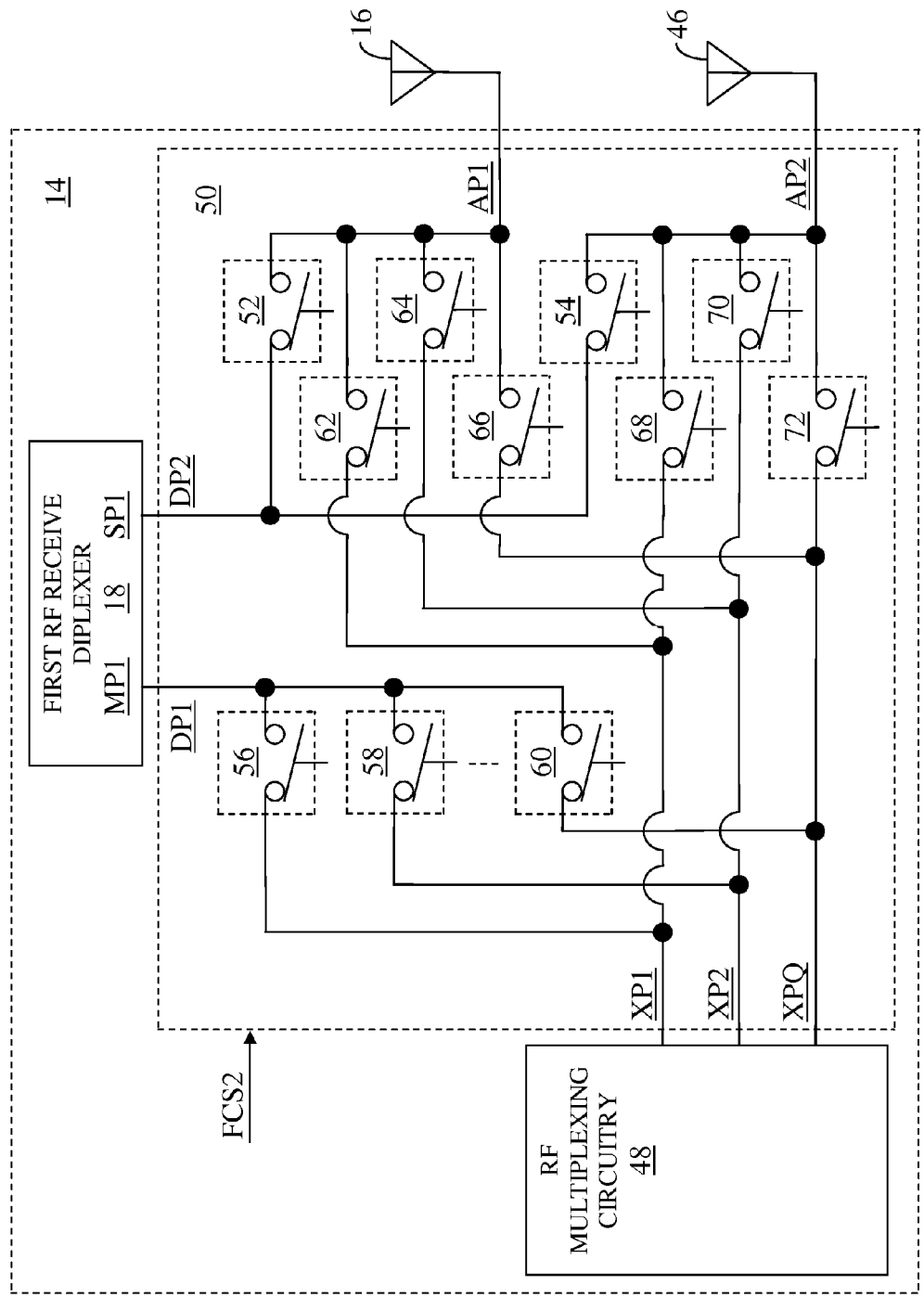
FIG. 7 shows details of the RF front-end circuitry, the first RF antenna, and the second RF antenna illustrated in FIG. 6 according to one embodiment of the RF front-end circuitry.

FIG. 7 shows details of the RF front-end circuitry 14, the first RF antenna 16, and the second RF antenna 46 illustrated in FIG. 6 according to one embodiment of the RF front-end circuitry 14. In the embodiment of the RF front-end circuitry 14 illustrated in FIG. 7, details of the RF antenna switching circuitry 50 are shown to clarify one embodiment of the invention, and the RF receive circuitry 22 and the RF transmit circuitry 24 are not shown to simplify FIG. 7.

The RF antenna switching circuitry 50 includes a first diplexer-to-antenna RF switch 52, a second diplexer-to-antenna RF switch 54, a first diplexer-to-MUX RF switch 56, a second diplexer-to-MUX RF switch 58, and up to and including a $Q^{TH}$ diplexer-to-MUX RF switch 60, a first MUX-to-first antenna switch 62, a second MUX-to-first antenna switch 64, and up to and including a $Q^{TH}$ MUX-to-first antenna RF switch 66, a first MUX-to-second antenna switch 68, a second MUX-to-second antenna switch 70, and up to and including a $Q^{TH}$ MUX-to-second antenna RF switch 72. In an alternate embodiment of the RF antenna switching circuitry 50, any of the RF switches 52, 54, 56, 58, 60, 62, 64, 66, 68, 70, 72 may be omitted.

The first diplexer-to-antenna RF switch 52 is coupled between the first RF antenna port AP1 and the second RF diplexer port DP2. The second diplexer-to-antenna RF switch 54 is coupled between the second RF antenna port AP2 and the second RF diplexer port DP2. The first diplexer-to-MUX RF switch 56 is coupled between the first RF multiplexer port XP1 and the first RF diplexer port DP1. The second diplexer-to-MUX RF switch 58 is coupled between the second RF multiplexer port XP2 and the first RF diplexer port DP1. The $Q^{TH}$ diplexer-to-MUX RF switch 60 is coupled between the $Q^{TH}$ RF multiplexer port XPQ and the first RF diplexer port DP1. The first MUX-to-first antenna switch 62 is coupled between the first RF antenna port AP1 and the first RF multiplexer port XP1. The second MUX-to-first antenna switch 64 is coupled between the first RF antenna port AP1 and the second RF multiplexer port XP2. The $Q^{TH}$ MUX-to-first antenna RF switch 66 is coupled between the first RF antenna port AP1 and the $Q^{TH}$ RF multiplexer port XPQ. The first MUX-to-second antenna switch 68 is coupled between the second RF antenna port AP2 and the first RF multiplexer port XP1. The second MUX-to-second antenna switch 70 is coupled between the second RF antenna port AP2 and the second RF multiplexer port XP2. The $Q^{TH}$ MUX-to-second antenna RF switch 72 is coupled between the second RF antenna port AP2 and the $Q^{TH}$ RF multiplexer port XPQ.

Each of the RF switches 52, 54, 56, 58, 60, 62, 64, 66, 68, 70, 72 is configured to be in one of an OPEN state and a CLOSED state. In one embodiment of the RF system control circuitry 12 (FIG. 6), the RF system control circuitry 12 (FIG. 6) selects the one of the OPEN state and the CLOSED state for each of the RF switches 52, 54, 56, 58, 60, 62, 64, 66, 68, 70, 72. In this regard, the RF system control circuitry 12 (FIG. 6) provides the second function configuration signal FCS2 to the RF antenna switching circuitry 50 to select the one of the OPEN state and the CLOSED state for each of the RF switches 52, 54, 56, 58, 60, 62, 64, 66, 68, 70, 72.

In this regard, the first diplexer-to-antenna RF switch 52 is coupled between the first isolation port SP1 and the first RF antenna 16. The second diplexer-to-antenna RF switch 54 is coupled between the first isolation port SP1 and the second RF antenna 46. In one embodiment of the RF communications circuitry 10 (FIG. 6), one of the first diplexer-to-antenna RF switch 52 and the second diplexer-to-antenna RF switch 54 is configured to be in the OPEN state and another of the first diplexer-to-antenna RF switch 52 and the second diplexer-to-antenna RF switch 54 is configured to be in the CLOSED state. As such, selection of the one of the first diplexer-to-antenna RF switch 52 and the second diplexer-to-antenna RF switch 54 and the another of the first diplexer-to-antenna RF switch 52 and the second diplexer-to-antenna RF switch 54 is based on the second function configuration signal FCS2.

In one embodiment of the RF communications circuitry 10 (FIG. 6), the RF communications circuitry 10 (FIG. 6) operates in one of a receive carrier aggregation (CA) mode and a non-CA mode. The RF system control circuitry 12 (FIG. 6) selects the one of the receive CA mode and the non-CA mode. As such, the RF system control circuitry 12 (FIG. 6) provides the second function configuration signal FCS2 based on the selection of the one of the receive CA mode and the non-CA mode. During the non-CA mode, both the first diplexer-to-antenna RF switch 52 and the second diplexer-to-antenna RF switch 54 are in the OPEN state, thereby substantially isolating the first RF receive diplexer 18 from both the first RF antenna 16 and the second RF antenna 46. During the receive CA mode, one of the first diplexer-to-antenna RF switch 52 and the second diplexer-to-antenna RF switch 54 is in the OPEN state and another of the first diplexer-to-antenna RF switch 52 and the second diplexer-to-antenna RF switch 54 is in the CLOSED state.

Figure 8:
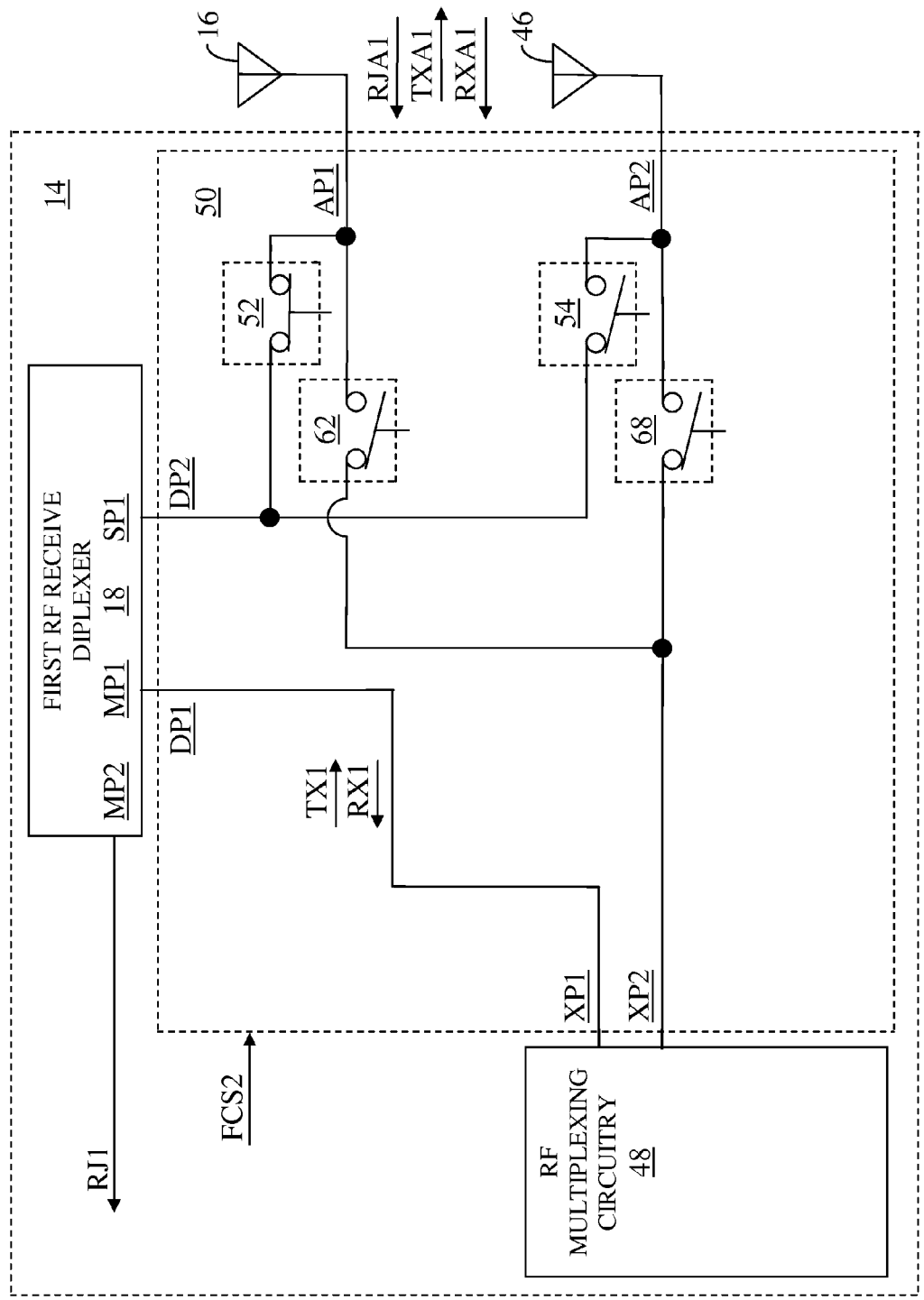
FIG. 8 shows details of the RF front-end circuitry, the first RF antenna, and the second RF antenna illustrated in FIG. 6 according to an alternate embodiment of the RF front-end circuitry.

FIG. 8 shows details of the RF front-end circuitry 14, the first RF antenna 16, and the second RF antenna 46 illustrated in FIG. 6 according to an alternate embodiment of the RF front-end circuitry 14. The RF front-end circuitry 14 illustrated in FIG. 8 is similar to the RF front-end circuitry 14 illustrated in FIG. 7, except in the RF front-end circuitry 14 illustrated in FIG. 8, the first diplexer-to-MUX RF switch 56, the second diplexer-to-MUX RF switch 58, the $Q^{TH}$ diplexer-to-MUX RF switch 60, the second MUX-to-first antenna switch 64, the $Q^{TH}$ MUX-to-first antenna RF switch 66, the second MUX-to-second antenna switch 70, and the $Q^{TH}$ MUX-to-second antenna RF switch 72 are omitted.

Additionally, the first RF diplexer port DP1 is directly coupled to the first RF multiplexer port XP1. The first MUX-to-first antenna switch 62 is coupled between the first RF antenna port AP1 and the second RF multiplexer port XP2 instead of being coupled between the first RF antenna port AP1 and the first RF multiplexer port XP1 as illustrated in FIG. 7. The first MUX-to-second antenna switch 68 is coupled between the second RF antenna port AP2 and the second RF multiplexer port XP2 instead of being coupled between the second RF antenna port AP2 and the first RF multiplexer port XP1 as illustrated in FIG. 7.

In the RF front-end circuitry 14 illustrated in FIG. 8, the first diplexer-to-antenna RF switch 52 is in the CLOSED state and each of the second diplexer-to-antenna RF switch 54, the first MUX-to-first antenna switch 62, and the first MUX-to-second antenna switch 68 is in the OPEN state. As such, the first RF antenna 16 is connected to the first isolation port SP1 via the first diplexer-to-antenna RF switch 52. The first main port MP1 is connected to the RF multiplexing circuitry 48. If the RF multiplexing circuitry 48 provides the same functionality as the first RF duplexer 20 (FIG. 1), then the RF front-end circuitry 14 provides similar behavior to the RF front-end circuitry 14 illustrated in FIG. 1. As such, the first adjunct RF antenna receive signal RJA1, the first RF antenna transmit signal TXA1, and the first RF antenna receive signal RXA1 are associated with a single RF antenna, namely the first RF antenna 16.

Therefore, the first RF receive diplexer 18 receives the first RF antenna receive signal RXA1 via the first isolation port SP1 to provide the first RF receive signal RX1 via the first main port MP1. In one embodiment of the first RF receive signal RX1 and the first adjunct RF receive signal RJ1, the first RF receive signal RX1 and the first adjunct RF receive signal RJ1 are carrier aggregation RF receive signals.

Figure 9:
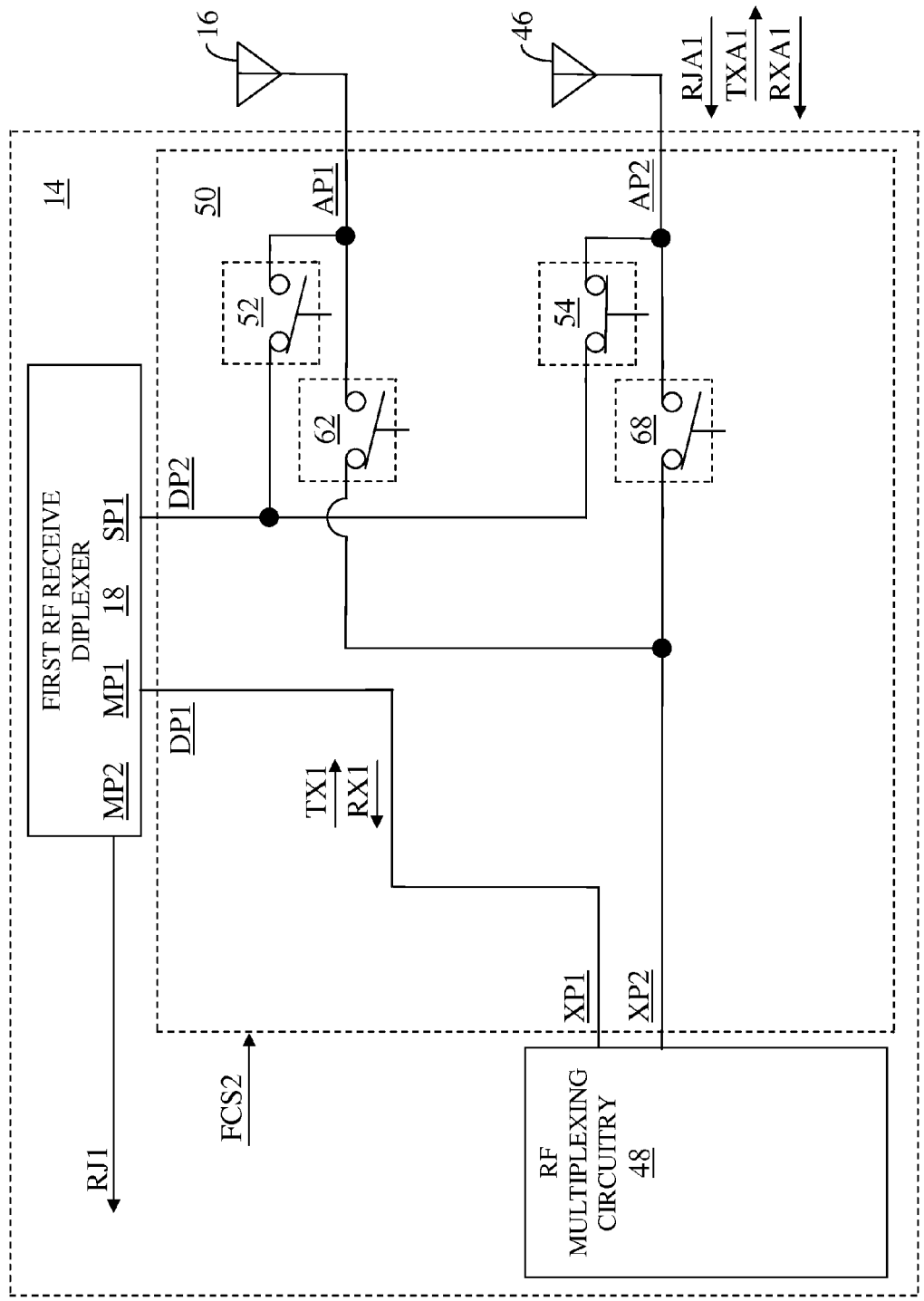
FIG. 9 shows details of the RF front-end circuitry, the first RF antenna, and the second RF antenna illustrated in FIG. 6 according to an additional embodiment of the RF front-end circuitry.

FIG. 9 shows details of the RF front-end circuitry 14, the first RF antenna 16, and the second RF antenna 46 illustrated in FIG. 6 according to an additional embodiment of the RF front-end circuitry 14. The RF front-end circuitry 14 illustrated in FIG. 9 is similar to the RF front-end circuitry 14 illustrated in FIG. 8, except in the RF front-end circuitry 14 illustrated in FIG. 9, the second diplexer-to-antenna RF switch 54 is in the CLOSED state and each of the first diplexer-to-antenna RF switch 52, the first MUX-to-first antenna switch 62, and the first MUX-to-second antenna switch 68 is in the OPEN state. As such, the second RF antenna 46 is connected to the first isolation port SP1 via the second diplexer-to-antenna RF switch 54. Therefore, the first adjunct RF antenna receive signal RJA1, the first RF antenna transmit signal TXA1, and the first RF antenna receive signal RXA1 are associated with a single RF antenna, namely the second RF antenna 46.

Figure 10:
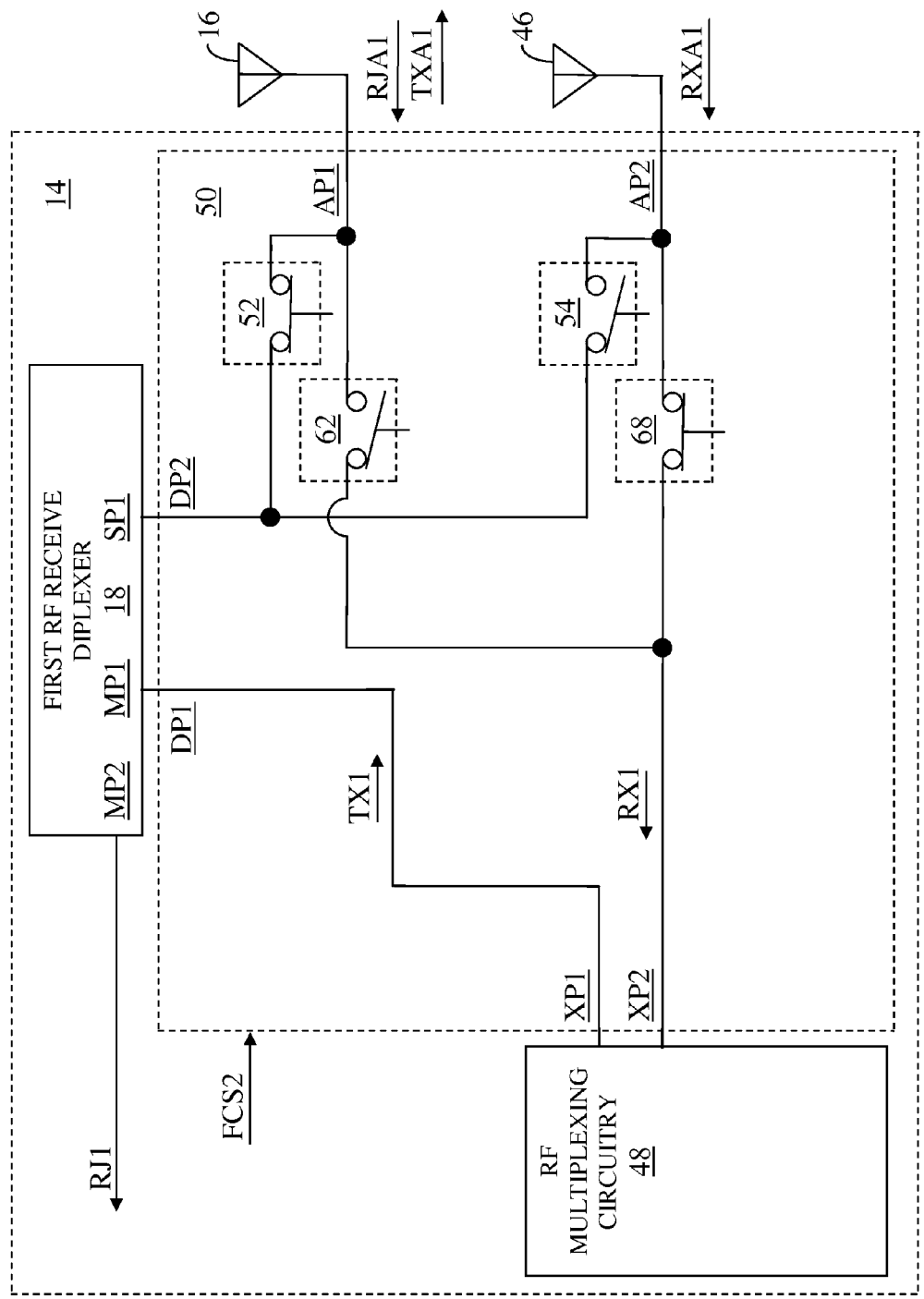
FIG. 10 shows details of the RF front-end circuitry, the first RF antenna, and the second RF antenna illustrated in FIG. 6 according to another embodiment of the RF front-end circuitry.

FIG. 10 shows details of the RF front-end circuitry 14, the first RF antenna 16, and the second RF antenna 46 illustrated in FIG. 6 according to another embodiment of the RF front-end circuitry 14. The RF front-end circuitry 14 illustrated in FIG. 10 is similar to the RF front-end circuitry 14 illustrated in FIG. 8, except in the RF front-end circuitry 14 illustrated in FIG. 10, both the first diplexer-to-antenna RF switch 52 and the first MUX-to-second antenna switch 68 are in the CLOSED state and both of the second diplexer-to-antenna RF switch 54 and the first MUX-to-first antenna switch 62 are in the OPEN state. As such, the first RF antenna 16 is connected to the first isolation port SP1 via the first diplexer-to-antenna RF switch 52 and the second RF antenna 46 is connected to the RF multiplexing circuitry 48 via the first MUX-to-second antenna switch 68. Therefore, the first adjunct RF antenna receive signal RJA1 and the first RF antenna transmit signal TXA1 are associated with the first RF antenna 16, and the first RF antenna receive signal RXA1 is associated with the second RF antenna 46.

In this regard, the RF multiplexing circuitry 48 receives the first RF receive signal RX1 via the second RF antenna 46 and the RF receive circuitry 22 (FIG. 6) receives the first adjunct RF receive signal RJ1 via the first RF antenna 16. Therefore, in one embodiment of the first RF receive signal RX1 and the first adjunct RF receive signal RJ1, the first RF receive signal RX1 and the first adjunct RF receive signal RJ1 are carrier aggregation RF receive signals. In one embodiment of the first adjunct RF receive signal RJ1, the first adjunct RF receive signal RJ1 is a diversity RF receive signal. In one embodiment of the first adjunct RF receive signal RJ1, the first adjunct RF receive signal RJ1 is a MIMO RF receive signal.

Figure 11:
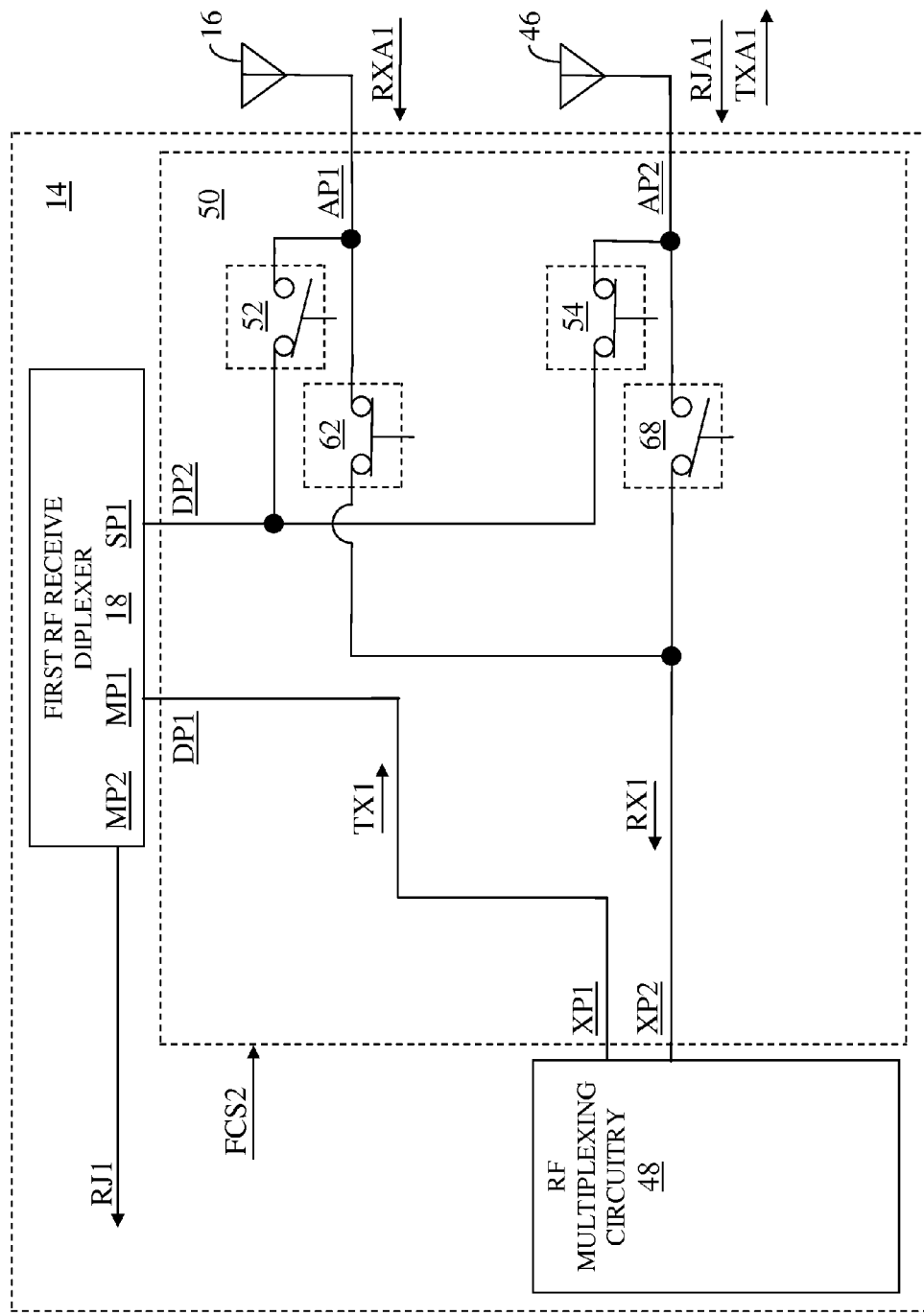
FIG. 11 shows details of the RF front-end circuitry, the first RF antenna, and the second RF antenna illustrated in FIG. 6 according to a further embodiment of the RF front-end circuitry.

FIG. 11 shows details of the RF front-end circuitry 14, the first RF antenna 16, and the second RF antenna 46 illustrated in FIG. 6 according to a further embodiment of the RF front-end circuitry 14. The RF front-end circuitry 14 illustrated in FIG. 11 is similar to the RF front-end circuitry 14 illustrated in FIG. 10, except in the RF front-end circuitry 14 illustrated in FIG. 11, both the first diplexer-to-antenna RF switch 52 and the first MUX-to-second antenna switch 68 are in the OPEN state and both of the second diplexer-to-antenna RF switch 54 and the first MUX-to-first antenna switch 62 are in the CLOSED state. As such, the second RF antenna 46 is connected to the first isolation port SP1 via the second diplexer-to-antenna RF switch 54 and the first RF antenna 16 is connected to the RF multiplexing circuitry 48 via the first MUX-to-first antenna switch 62. Therefore, the first adjunct RF antenna receive signal RJA1 and the first RF antenna transmit signal TXA1 are associated with the second RF antenna 46, and the first RF antenna receive signal RXA1 is associated with the first RF antenna 16.

In this regard, the RF multiplexing circuitry 48 receives the first RF receive signal RX1 via the first RF antenna 16 and the RF receive circuitry 22 (FIG. 6) receives the first adjunct RF receive signal RJ1 via the second RF antenna 46. Therefore, in one embodiment of the first RF receive signal RX1 and the first adjunct RF receive signal RJ1, the first RF receive signal RX1 and the first adjunct RF receive signal RJ1 are carrier aggregation RF receive signals. In one embodiment of the first adjunct RF receive signal RJ1, the first adjunct RF receive signal RJ1 is a diversity RF receive signal. In one embodiment of the first adjunct RF receive signal RJ1, the first adjunct RF receive signal RJ1 is a MIMO RF receive signal.

In one embodiment of the first RF transmit signal TX1, the first RF receive signal RX1, and the first adjunct RF receive signal RJ1; the first RF transmit signal TX1 is a Band 5 transmit signal, the first RF receive signal RX1 is a Band 5 receive signal, and the first adjunct RF receive signal RJ1 is a Band 12 MIMO receive signal. In this regard, a carrier frequency of the first RF transmit signal TX1 is between about 824 megahertz and about 849 megahertz. A carrier frequency of the first RF receive signal RX1 is between about 869 megahertz and about 894 megahertz. A carrier frequency of the first adjunct RF receive signal RJ1 is between about 729 megahertz and about 746 megahertz.

In an alternate embodiment of the first RF transmit signal TX1, the first RF receive signal RX1, and the first adjunct RF receive signal RJ1; the first RF transmit signal TX1 is a Band 12 transmit signal, the first RF receive signal RX1 is a Band 12 receive signal, and the first adjunct RF receive signal RJ1 is a Band 5 MIMO receive signal. In this regard, the carrier frequency of the first RF transmit signal TX1 is between about 699 megahertz and about 716 megahertz. The carrier frequency of the first RF receive signal RX1 is between about 729 megahertz and about 746 megahertz. The carrier frequency of the first adjunct RF receive signal RJ1 is between about 869 megahertz and about 894 megahertz.

In an additional embodiment of the first RF transmit signal TX1, the first RF receive signal RX1, and the first adjunct RF receive signal RJ1; the first RF transmit signal TX1 is a Band 5 transmit signal, the first RF receive signal RX1 is a Band 5 receive signal, and the first adjunct RF receive signal RJ1 is a Band 13 MIMO receive signal. In this regard, the carrier frequency of the first RF transmit signal TX1 is between about 824 megahertz and about 849 megahertz. The carrier frequency of the first RF receive signal RX1 is between about 869 megahertz and about 894 megahertz. The carrier frequency of the first adjunct RF receive signal RJ1 is between about 746 megahertz and about 756 megahertz.

In another embodiment of the first RF transmit signal TX1, the first RF receive signal RX1, and the first adjunct RF receive signal RJ1; the first RF transmit signal TX1 is a Band 13 transmit signal, the first RF receive signal RX1 is a Band 13 receive signal, and the first adjunct RF receive signal RJ1 is a Band 5 MIMO receive signal. In this regard, the carrier frequency of the first RF transmit signal TX1 is between about 777 megahertz and about 787 megahertz. The carrier frequency of the first RF receive signal RX1 is between about 746 megahertz and about 756 megahertz. The carrier frequency of the first adjunct RF receive signal RJ1 is between about 868 megahertz and about 894 megahertz.

Figure 12:
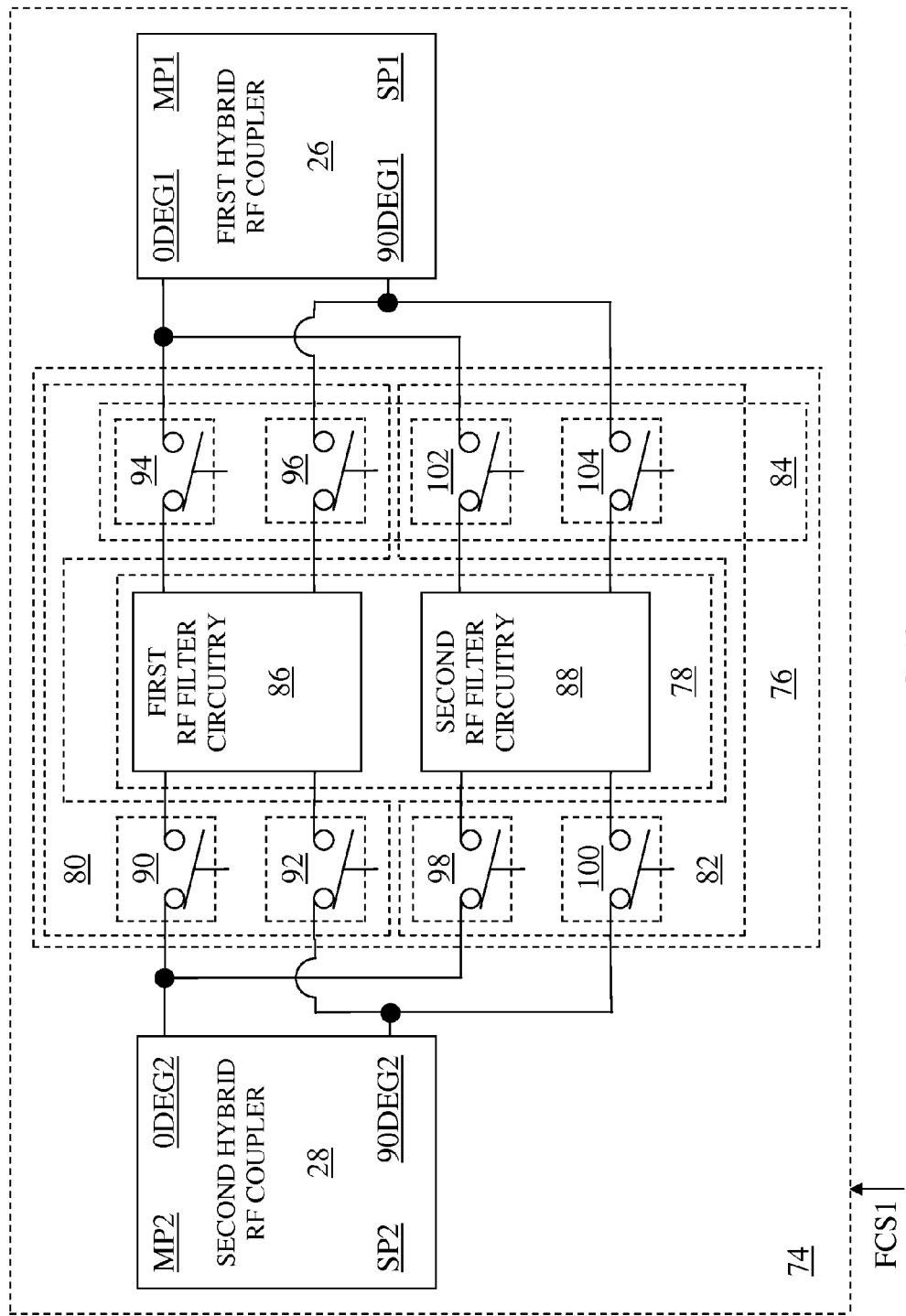
FIG. 12 shows details of a reconfigurable RF receive diplexer according to one embodiment of the reconfigurable RF receive diplexer.

FIG. 12 shows details of a reconfigurable RF receive diplexer 74 according to one embodiment of the reconfigurable RF receive diplexer 74. The reconfigurable RF receive diplexer 74 illustrated in FIG. 12 is similar to the first RF receive diplexer 18 illustrated in FIGS. 2 and 3, except the reconfigurable RF receive diplexer 74 uses reconfigurable RF filter circuitry 76 instead of the RF filter circuitry 30 illustrated in FIGS. 2 and 3.

The reconfigurable RF receive diplexer 74 includes the first hybrid RF coupler 26, the second hybrid RF coupler 28, and the reconfigurable RF filter circuitry 76. The reconfigurable RF filter circuitry 76 includes a group 78 of RF filter circuits, a first group 80 of RF switches, and a second group 82 of RF switches. A group 84 of antenna facing RF switches includes a portion of the first group 80 of RF switches and a portion of the second group 82 of RF switches. The group 78 of RF filter circuits includes first RF filter circuitry 86 and second RF filter circuitry 88.

The first group 80 of RF switches includes a first diplexer RF switch 90, a second diplexer RF switch 92, a third diplexer RF switch 94, and a fourth diplexer RF switch 96. The second group 82 of RF switches includes a fifth diplexer RF switch 98, a sixth diplexer RF switch 100, a seventh diplexer RF switch 102, and an eighth diplexer RF switch 104. The group 84 of antenna facing RF switches includes the third diplexer RF switch 94, the fourth diplexer RF switch 96, the seventh diplexer RF switch 102, and the eighth diplexer RF switch 104. The diplexer RF switches 90, 92, 94, 96, 98, 100, 102, 104 are used to configure the reconfigurable RF receive diplexer 74 based on the first function configuration signal FCS1. As such, the RF system control circuitry 12 (FIG. 1) configures the reconfigurable RF receive diplexer 74 using the first function configuration signal FCS1.

The first diplexer RF switch 90 is coupled between the second in-phase port 0DEG2 and the first RF filter circuitry 86. The second diplexer RF switch 92 is coupled between the second quadrature-phase port 90DEG2 and the first RF filter circuitry 86. The third diplexer RF switch 94 is coupled between the first in-phase port 0DEG1 and the first RF filter circuitry 86. The fourth diplexer RF switch 96 is coupled between the first quadrature-phase port 90DEG1 and the first RF filter circuitry 86.

The fifth diplexer RF switch 98 is coupled between the second in-phase port 0DEG2 and the second RF filter circuitry 88. The sixth diplexer RF switch 100 is coupled between the second quadrature-phase port 90DEG2 and the second RF filter circuitry 88. The seventh diplexer RF switch 102 is coupled between first in-phase port 0DEG1 and the second RF filter circuitry 88. The eighth diplexer RF switch 104 is coupled between the first quadrature-phase port 90DEG1 and the second RF filter circuitry 88.

The first in-phase port 0DEG1 and the first quadrature-phase port 90DEG1 provide the first pair of quadrature ports. The second in-phase port 0DEG2 and the second quadrature-phase port 90DEG2 provide the second pair of quadrature ports. Therefore, the reconfigurable RF filter circuitry 76 is coupled between the first pair of quadrature ports and the second pair of quadrature ports.

Figure 13:
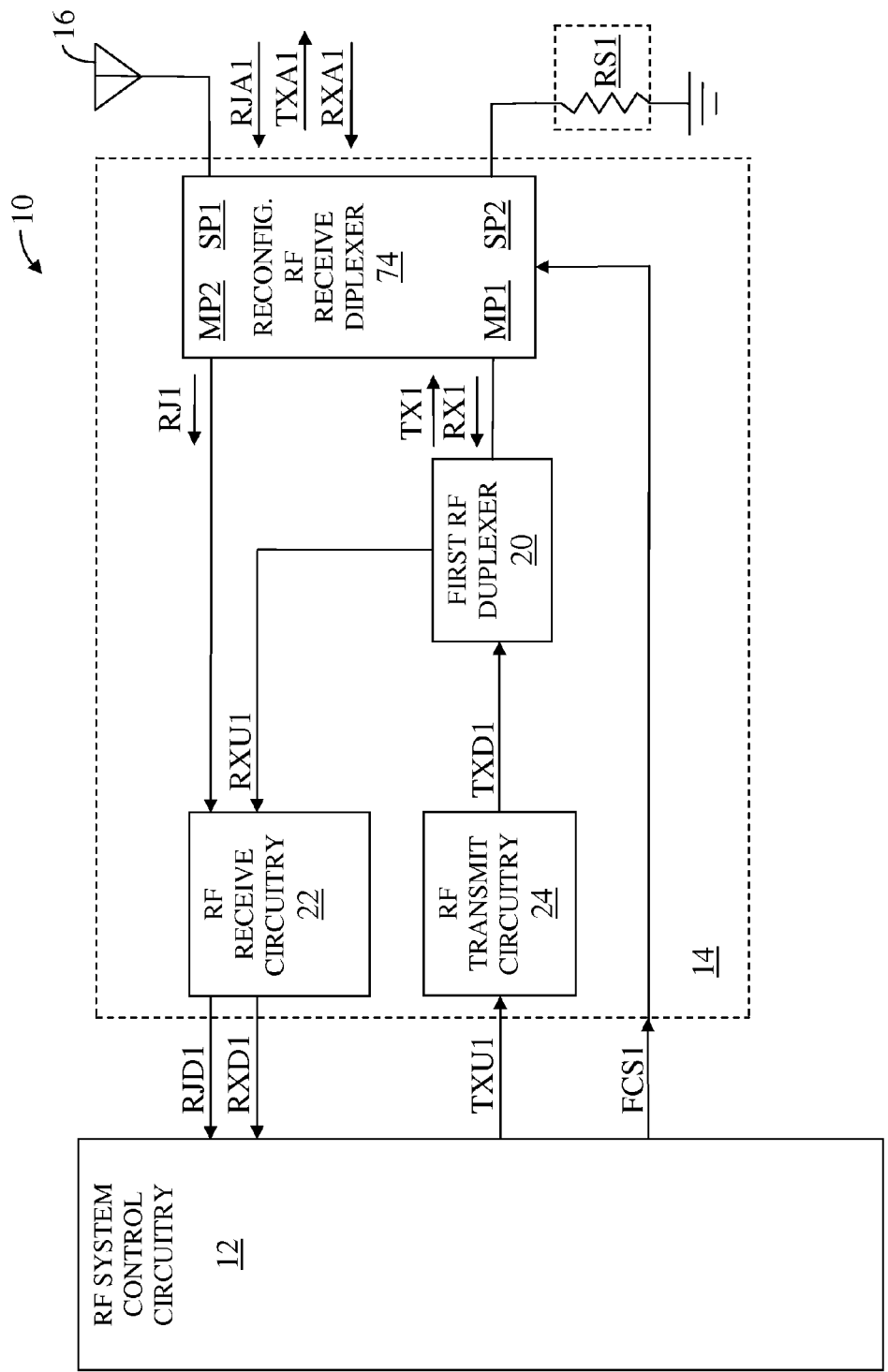
FIG. 13 shows RF communications circuitry according to one embodiment of the RF communications circuitry.

In one embodiment of the reconfigurable RF receive diplexer 74, the reconfigurable RF receive diplexer 74 receives the first adjunct RF antenna receive signal RJA1 (FIG. 13) via the first isolation port SP1 (FIG. 13) to provide the first adjunct RF receive signal RJ1 (FIG. 13) via the second main port MP2 (FIG. 13). Further, the reconfigurable RF receive diplexer 74 receives the first RF transmit signal TX1 (FIG. 13) via the first main port MP1 (FIG. 13) to provide the first RF antenna transmit signal TXA1 (FIG. 13) via the first isolation port SP1 (FIG. 13). Additionally, the reconfigurable RF receive diplexer 74 receives the first RF antenna receive signal RXA1 (FIG. 13) via the first isolation port SP1 (FIG. 13) to provide the first RF receive signal RX1 (FIG. 13) via the first main port MP1 (FIG. 13).

In one embodiment of the reconfigurable RF receive diplexer 74, the first RF receive signal RX1 (FIG. 13) and the first adjunct RF receive signal RJ1 (FIG. 13) are carrier aggregation RF receive signals. In one embodiment of the reconfigurable RF receive diplexer 74, the first hybrid RF coupler 26 (FIG. 2) receives the first RF antenna receive signal RXA1 (FIG. 2) via the first isolation port SP1 (FIG. 2), and splits and phase-shifts the first RF antenna receive signal RXA1 (FIG. 2) to provide the first in-phase RF receive signal RXN1 (FIG. 2) and the first quadrature-phase RF receive signal RXQ1 (FIG. 2) to the reconfigurable RF filter circuitry 76.

In one embodiment of the reconfigurable RF receive diplexer 74, the reconfigurable RF filter circuitry 76 substantially reflects the first in-phase RF receive signal RXN1 (FIG. 2) and the first quadrature-phase RF receive signal RXQ1 (FIG. 2) to provide the first reflected in-phase RF receive signal RRN1 (FIG. 2) and the first reflected quadrature-phase RF receive signal RRQ1 (FIG. 2) to the first hybrid RF coupler 26 (FIG. 2). The first hybrid RF coupler 26 (FIG. 2) receives, phase-shifts, and combines the first reflected in-phase RF receive signal RRN1 (FIG. 2) and the first reflected quadrature-phase RF receive signal RRQ1 (FIG. 2) to provide the first RF receive signal RX1 (FIG. 2) via the first main port MP1 (FIG. 2).

In one embodiment of the reconfigurable RF receive diplexer 74, the first hybrid RF coupler 26 (FIG. 3) receives, splits, and phase-shifts the first RF transmit signal TX1 (FIG. 3) to provide the first in-phase RF transmit signal TXN1 (FIG. 3) and the first quadrature-phase RF transmit signal TXQ1 (FIG. 3) to the reconfigurable RF filter circuitry 76. The reconfigurable RF filter circuitry 76 substantially reflects the first in-phase RF transmit signal TXN1 (FIG. 3) and the first quadrature-phase RF transmit signal TXQ1 (FIG. 3) to provide the first reflected in-phase RF transmit signal TRN1 (FIG. 3) and the first reflected quadrature-phase RF transmit signal TRQ1 (FIG. 3) to the first hybrid RF coupler 26 (FIG. 3). The first hybrid RF coupler 26 (FIG. 3) receives, phase-shifts, and combines the first reflected in-phase RF transmit signal TRN1 (FIG. 3) and the first reflected quadrature-phase RF transmit signal TRQ1 (FIG. 3) to provide the first RF antenna transmit signal TXA1 (FIG. 3) via the first isolation port SP1 (FIG. 3).

In one embodiment of the reconfigurable RF receive diplexer 74, the reconfigurable RF receive diplexer 74 operates in each of a group of operating modes. During a first operating mode of the group of operating modes, a carrier frequency of the first adjunct RF antenna receive signal RJA1 (FIG. 13) is within a first RF communications band. During a second operating mode of the group of operating modes, a carrier frequency of the first adjunct RF antenna receive signal RJA1 (FIG. 13) is within a second RF communications band.

In this regard, the first group 80 of RF switches is coupled between the first RF filter circuitry 86 and the first pair of quadrature ports. Additionally, the first group 80 of RF switches is further coupled between the first RF filter circuitry 86 and the second pair of quadrature ports. The second group 82 of RF switches is coupled between the second RF filter circuitry 88 and the first pair of quadrature ports. Additionally, the second group 82 of RF switches is further coupled between the second RF filter circuitry 88 and the second pair of quadrature ports.

In one embodiment of the reconfigurable RF receive diplexer 74, the first RF filter circuitry 86 is associated with the first RF communications band and the second RF filter circuitry 88 is associated with the second RF communications band.

In this regard, during the first operating mode, each of the first group 80 of RF switches is in a CLOSED state, thereby functionally coupling the first RF filter circuitry 86 between the first pair of quadrature ports and the second pair of quadrature ports. Further, during the first operating mode, each of the second group 82 of RF switches is in an OPEN state, thereby functionally isolating the second RF filter circuitry 88 from the first pair of quadrature ports and from the second pair of quadrature ports.

During the second operating mode, each of the first group 80 of RF switches is in an OPEN state, thereby functionally isolating the first RF filter circuitry 86 from the first pair of quadrature ports and from the second pair of quadrature ports. During the second operating mode, each of the second group 82 of RF switches is in a CLOSED state, thereby functionally coupling the second RF filter circuitry 88 between the first pair of quadrature ports and the second pair of quadrature ports.

In one embodiment of the reconfigurable RF receive diplexer 74, the group 84 of antenna facing RF switches is coupled between the first RF filter circuitry 86 and the first pair of quadrature ports. The group 84 of antenna facing RF switches is further coupled between the second RF filter circuitry 88 and the first pair of quadrature ports. During a third operating mode of the group of operating modes, each of the group 84 of antenna facing RF switches is configured to be in an OPEN state, thereby functionally isolating the first RF filter circuitry 86 from the first pair of quadrature ports and functionally isolating the second RF filter circuitry 88 from the first pair of quadrature ports.

In one embodiment of the reconfigurable RF receive diplexer 74, each of the first group 80 of diplexer RF switches and the second group 82 of diplexer RF switches is configured to be in one of the OPEN state and the CLOSED state based on the first function configuration signal FCS1. In alternate embodiments of the reconfigurable RF receive diplexer 74, the group 78 of RF filter circuits may include any number of RF filter circuits. Accordingly, the first group 80 of RF switches may include any number of RF switches and the second group 82 of RF switches may include any number of RF switches.

In a first embodiment of the first RF communications band, the first RF communications band includes frequencies between 2110 megahertz and 2170 megahertz. In a second embodiment of the first RF communications band, the first RF communications band includes frequencies between 1930 megahertz and 1990 megahertz. In a third embodiment of the first RF communications band, the first RF communications band includes frequencies between 1805 megahertz and 1880 megahertz. In a fourth embodiment of the first RF communications band, the first RF communications band includes frequencies between 2110 megahertz and 2155 megahertz.

In a fifth embodiment of the first RF communications band, the first RF communications band includes frequencies between 869 megahertz and 894 megahertz. In a sixth embodiment of the first RF communications band, the first RF communications band includes frequencies between 2620 megahertz and 2690 megahertz. In a seventh embodiment of the first RF communications band, the first RF communications band includes frequencies between 925 megahertz and 960 megahertz. In an eighth embodiment of the first RF communications band, the first RF communications band includes frequencies between 729 megahertz and 746 megahertz.

In a ninth embodiment of the first RF communications band, the first RF communications band includes frequencies between 746 megahertz and 756 megahertz. In a tenth embodiment of the first RF communications band, the first RF communications band includes frequencies between 791 megahertz and 821 megahertz. In an eleventh embodiment of the first RF communications band, the first RF communications band includes frequencies between 2350 megahertz and 2360 megahertz. In a twelfth embodiment of the first RF communications band, the first RF communications band includes frequencies between 1880 megahertz and 1920 megahertz.

In a thirteenth embodiment of the first RF communications band, the first RF communications band includes frequencies between 2300 megahertz and 2400 megahertz. In a fourteenth embodiment of the first RF communications band, the first RF communications band includes frequencies between 2496 megahertz and 2690 megahertz.

In a first embodiment of the second RF communications band, the second RF communications band includes frequencies between 2110 megahertz and 2170 megahertz. In a second embodiment of the second RF communications band, the second RF communications band includes frequencies between 1930 megahertz and 1990 megahertz. In a third embodiment of the second RF communications band, the second RF communications band includes frequencies between 1805 megahertz and 1880 megahertz. In a fourth embodiment of the second RF communications band, the second RF communications band includes frequencies between 2110 megahertz and 2155 megahertz.

In a fifth embodiment of the second RF communications band, the second RF communications band includes frequencies between 869 megahertz and 894 megahertz. In a sixth embodiment of the second RF communications band, the second RF communications band includes frequencies between 2620 megahertz and 2690 megahertz. In a seventh embodiment of the second RF communications band, the second RF communications band includes frequencies between 925 megahertz and 960 megahertz. In an eighth embodiment of the second RF communications band, the second RF communications band includes frequencies between 729 megahertz and 746 megahertz.

In a ninth embodiment of the second RF communications band, the second RF communications band includes frequencies between 746 megahertz and 756 megahertz. In a tenth embodiment of the second RF communications band, the second RF communications band includes frequencies between 791 megahertz and 821 megahertz. In an eleventh embodiment of the second RF communications band, the second RF communications band includes frequencies between 2350 megahertz and 2360 megahertz. In a twelfth embodiment of the second RF communications band, the second RF communications band includes frequencies between 1880 megahertz and 1920 megahertz.

In a thirteenth embodiment of the second RF communications band, the second RF communications band includes frequencies between 2300 megahertz and 2400 megahertz. In a fourteenth embodiment of the second RF communications band, the second RF communications band includes frequencies between 2496 megahertz and 2690 megahertz.

FIG. 13 shows RF communications circuitry 10 according to one embodiment of the RF communications circuitry 10. The RF communications circuitry 10 illustrated in FIG. 13 is similar to the RF communications circuitry 10 illustrated in FIG. 1, except in the RF communications circuitry 10 illustrated in FIG. 13, the first RF receive diplexer 18 is replaced with the reconfigurable RF receive diplexer 74.

In one embodiment of the reconfigurable RF receive diplexer 74, the reconfigurable RF receive diplexer 74 receives the first RF transmit signal TX1 and the first adjunct RF antenna receive signal RJA1 simultaneously. In an alternate embodiment of the reconfigurable RF receive diplexer 74, the reconfigurable RF receive diplexer 74 receives the first RF transmit signal TX1, the first RF antenna receive signal RXA1, and the first adjunct RF antenna receive signal RJA1 simultaneously. In one embodiment of the reconfigurable RF receive diplexer 74, the first isolation port SP1 is coupled to the first RF antenna 16.

Figure 14:
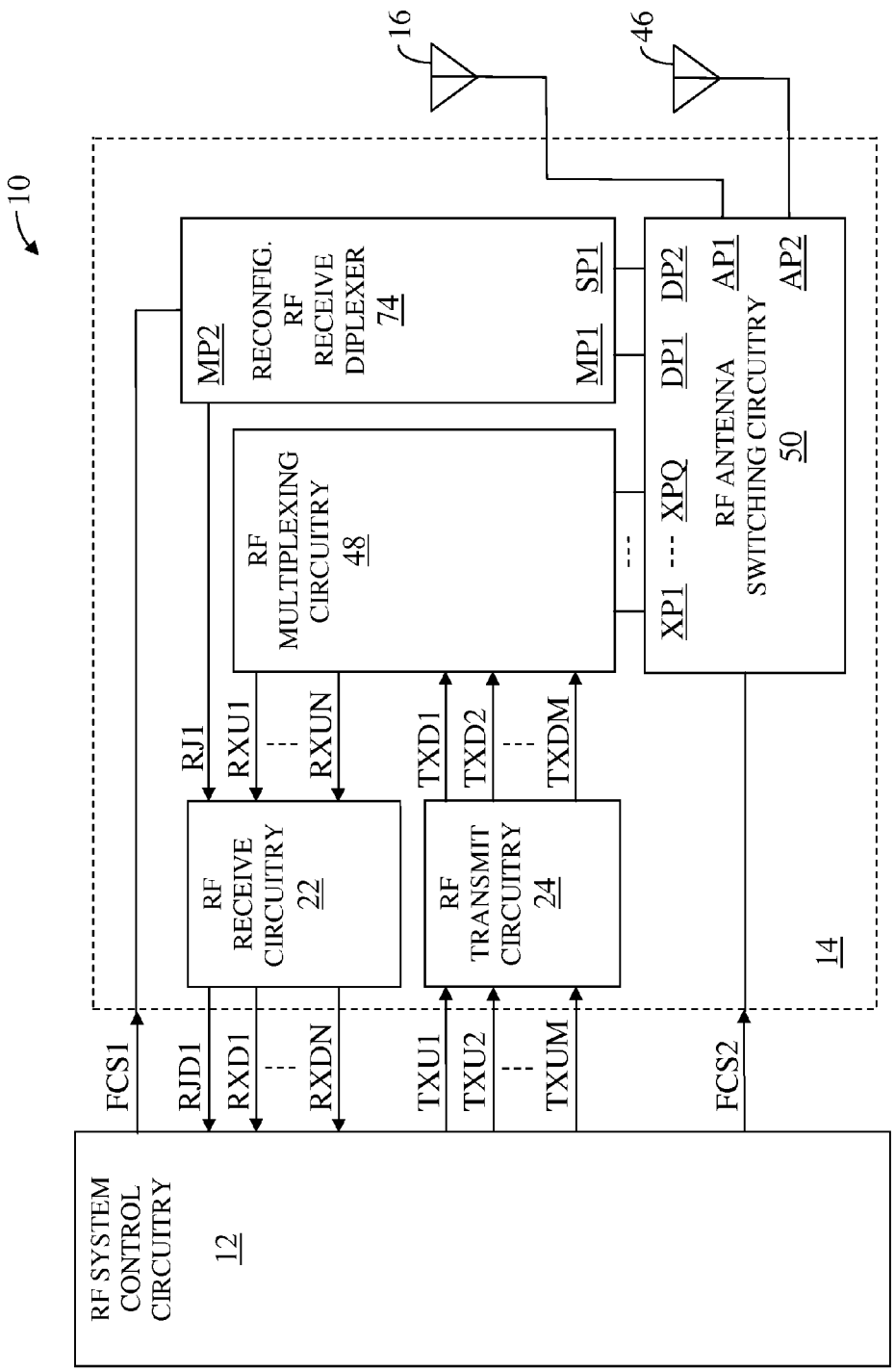
FIG. 14 shows RF communications circuitry according to an alternate embodiment of the RF communications circuitry.

FIG. 14 shows RF communications circuitry 10 according to an alternate embodiment of the RF communications circuitry 10. The RF communications circuitry 10 illustrated in FIG. 14 is similar to the RF communications circuitry 10 illustrated in FIG. 6, except in the RF communications circuitry 10 illustrated in FIG. 14, the first RF receive diplexer 18 is replaced with the reconfigurable RF receive diplexer 74.

In one embodiment of the reconfigurable RF receive diplexer 74, the first isolation port SP1 is coupled to a selected one of the first RF antenna 16 and the second RF antenna 46 via the RF antenna switching circuitry 50 based on the second function configuration signal FCS2. In one embodiment of the reconfigurable RF receive diplexer 74, a selected another of the first RF antenna 16 and the second RF antenna 46 is coupled to the RF multiplexing circuitry 48 via the RF antenna switching circuitry 50 based on the second function configuration signal FCS2. In one embodiment of the reconfigurable RF receive diplexer 74, the first main port MP1 is coupled to the RF multiplexing circuitry 48 via the RF antenna switching circuitry 50 based on the second function configuration signal FCS2.

Figure 15:
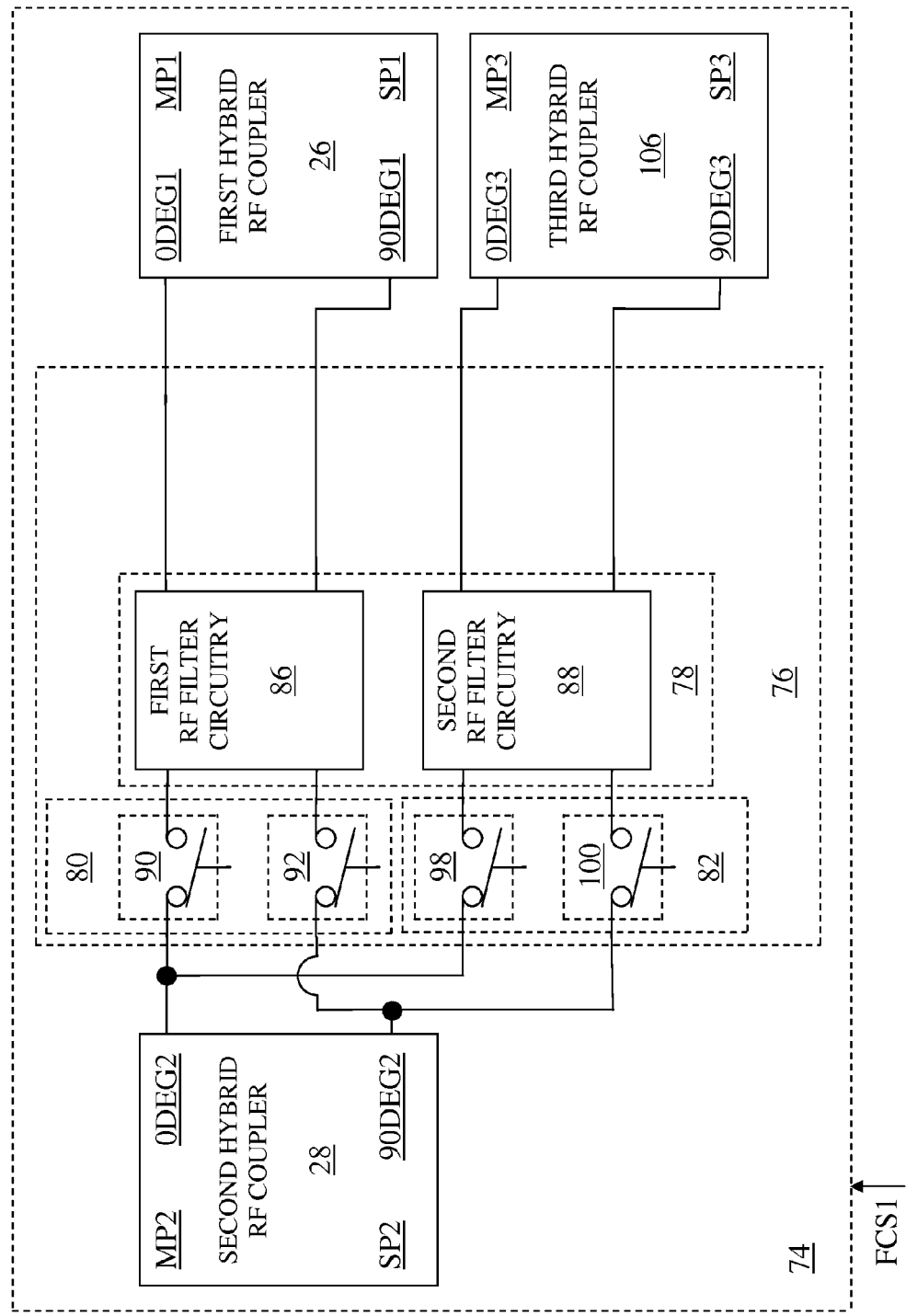
FIG. 15 shows details of the reconfigurable RF receive diplexer according to an alternate embodiment of the reconfigurable RF receive diplexer.

FIG. 15 shows details of the reconfigurable RF receive diplexer 74 according to an alternate embodiment of the reconfigurable RF receive diplexer 74. The reconfigurable RF receive diplexer 74 illustrated in FIG. 15 is similar to the reconfigurable RF receive diplexer 74 illustrated in FIG. 12, except in the reconfigurable RF receive diplexer 74 illustrated in FIG. 15, the reconfigurable RF receive diplexer 74 further includes a third hybrid RF coupler 106 and the group 84 of antenna facing RF switches is omitted.

The third hybrid RF coupler 106 has a third isolation port SP3, a third main port MP3, a third in-phase port 0DEG3, and a third quadrature-phase port 90DEG3. The third in-phase port 0DEG3 and the third quadrature-phase port 90DEG3 provide a third pair of quadrature ports. In this regard, the first pair of quadrature ports are directly coupled to the first RF filter circuitry 86 and the third pair of quadrature ports are directly coupled to the second RF filter circuitry 88.

The reconfigurable RF filter circuitry 76 includes the first RF filter circuitry 86, the second RF filter circuitry 88, the first group 80 of RF switches, and the second group 82 of RF switches. The first group 80 of RF switches is coupled between the first RF filter circuitry 86 and the second pair of quadrature ports. The second group 82 of RF switches is coupled between the second RF filter circuitry 88 and the second pair of quadrature ports.

During the first operating mode, each of the first group 80 of RF switches is in a CLOSED state, thereby functionally coupling the first RF filter circuitry 86 between the first pair of quadrature ports and the second pair of quadrature ports. During the first operating mode, each of the second group 82 of RF switches is in an OPEN state, thereby functionally isolating the second RF filter circuitry 88 from the second pair of quadrature ports.

During the second operating mode, each of the first group 80 of RF switches is in an OPEN state, thereby functionally isolating the first RF filter circuitry 86 from the second pair of quadrature ports. During the second operating mode, each of the second group 82 of RF switches is configured to be in a CLOSED state, thereby functionally coupling the second RF filter circuitry 88 between the second pair of quadrature ports and the third pair of quadrature ports.

During the first operating mode, the first hybrid RF coupler 26 receives the first adjunct RF antenna receive signal RJA1 (FIG. 13) via the first isolation port SP1 to provide the first adjunct RF receive signal RJ1 (FIG. 13) via the second main port MP2. During the first operating mode, the first hybrid RF coupler 26 receives the first RF transmit signal TX1 (FIG. 13) via the first main port MP1 to provide the first RF antenna transmit signal TXA1 (FIG. 13) via the first isolation port SP1.

During the second operating mode, the third hybrid RF coupler 106 receives the first adjunct RF antenna receive signal RJA1 (FIG. 13) via the third isolation port SP3 to provide the first adjunct RF receive signal RJ1 (FIG. 13) via the second main port MP2. During the second operating mode, the third hybrid RF coupler 106 receives the first RF transmit signal TX1 (FIG. 13) via the third main port MP3 to provide the first RF antenna transmit signal TXA1 (FIG. 13) via the third isolation port SP3.

By using the first hybrid RF coupler 26 during the first operating mode and the third hybrid RF coupler 106 during the second operating mode, phase-shifting characteristics of each of the first hybrid RF coupler 26 and the third hybrid RF coupler 106 may be optimized for frequency bands of operation during each of the first operating mode and the second operating mode. However, since the second hybrid RF coupler 28 is used for both the first operating mode and the second operating mode, its phase-shifting characteristics may be less than optimal for both the first operating mode and the second operating mode.

As a result, in one embodiment of the reconfigurable RF receive diplexer 74, phase-shifting characteristics of the second hybrid RF coupler 28 are tunable based on the first function configuration signal FCS1, such that during the first operating mode, the second hybrid RF coupler 28 has a first phase-shift characteristic; and during the second operating mode, the second hybrid RF coupler 28 has a second phase-shift characteristic.

Figure 16:
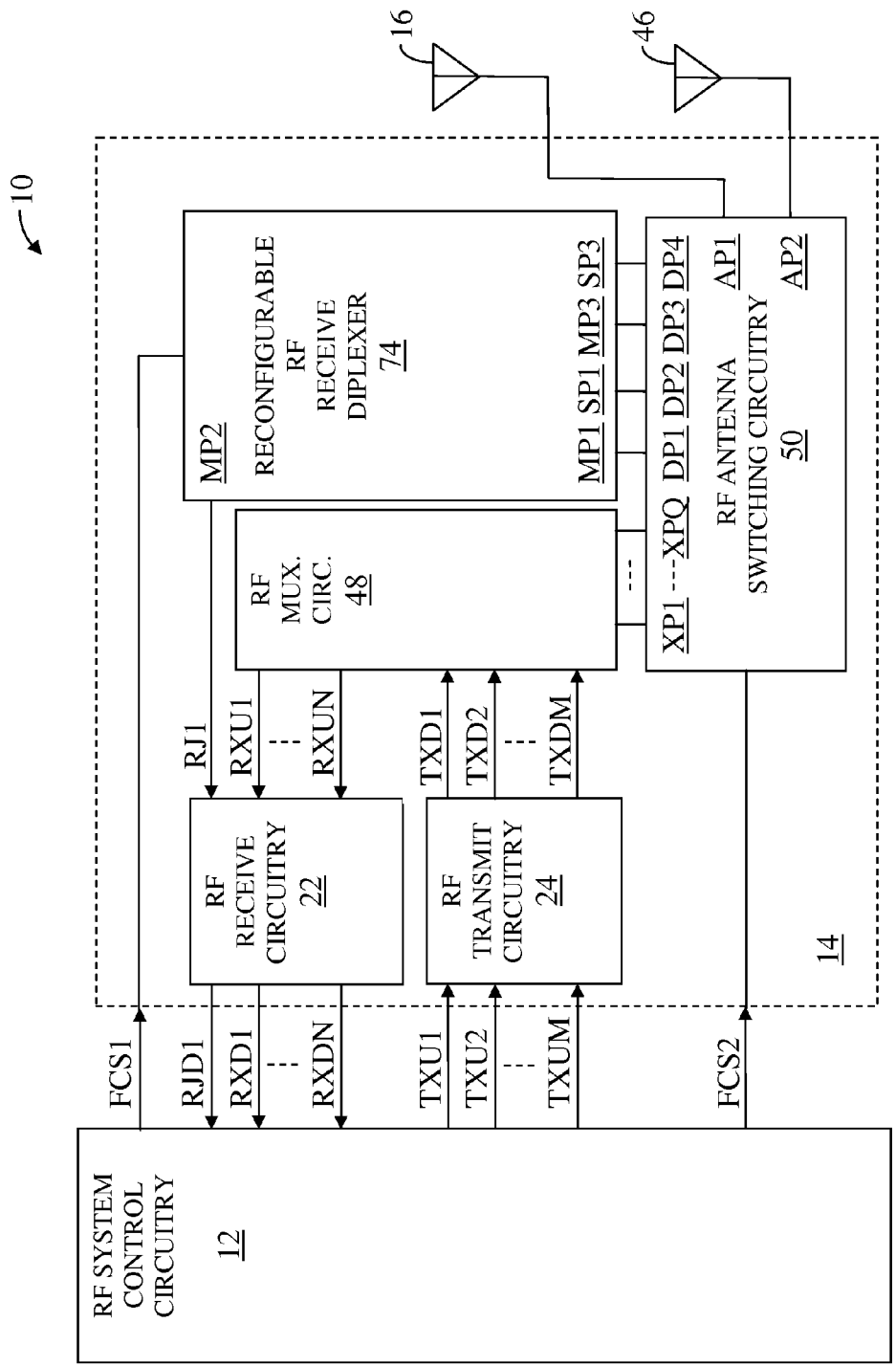
FIG. 16 shows RF communications circuitry according to an additional embodiment of the RF communications circuitry.

FIG. 16 shows RF communications circuitry 10 according to an additional embodiment of the RF communications circuitry 10. The RF communications circuitry 10 illustrated in FIG. 16 is similar to the RF communications circuitry 10 illustrated in FIG. 14, except in the RF communications circuitry 10 illustrated in FIG. 16, the reconfigurable RF receive diplexer 74 further includes the third isolation port SP3 and the third main port MP3; and the RF antenna switching circuitry 50 further includes a third RF diplexer port DP3 and a fourth RF diplexer port DP4. The third isolation port SP3 is coupled to the fourth RF diplexer port DP4 and the third main port MP3 is coupled to the third RF diplexer port DP3.

Figure 17:
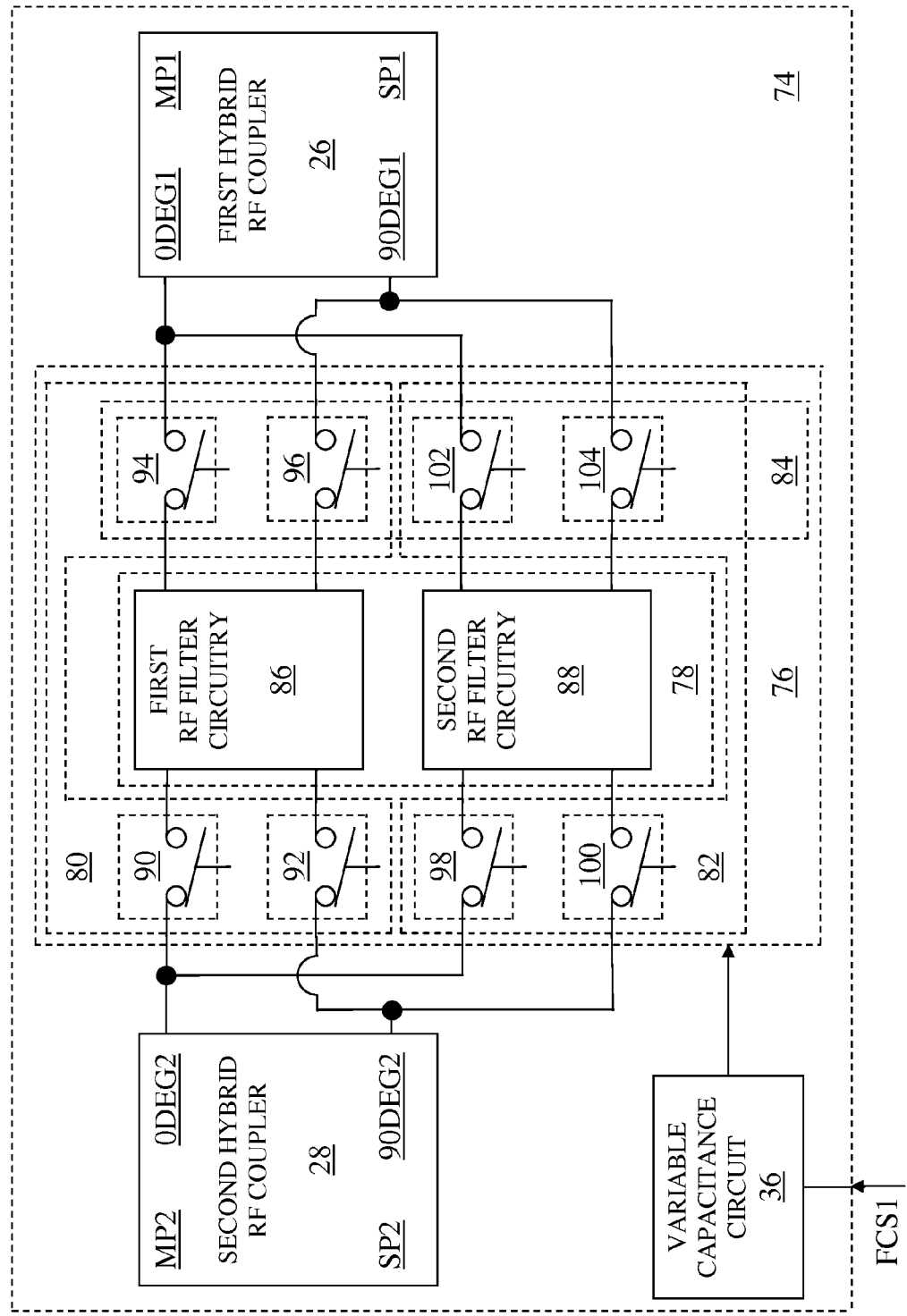
FIG. 17 shows details of the reconfigurable RF receive diplexer according to an additional embodiment of the reconfigurable RF receive diplexer.

FIG. 17 shows details of the reconfigurable RF receive diplexer 74 according to an additional embodiment of the reconfigurable RF receive diplexer 74. The reconfigurable RF receive diplexer 74 illustrated in FIG. 17 is similar to the reconfigurable RF receive diplexer 74 illustrated in FIG. 12, except the reconfigurable RF receive diplexer 74 illustrated in FIG. 17 further includes a variable capacitance circuit 36.

In one embodiment of the reconfigurable RF receive diplexer 74, the reconfigurable RF filter circuitry 76 includes SAW RF filter circuitry coupled between the first pair of quadrature ports and the second pair of quadrature ports. In an alternate embodiment of the reconfigurable RF receive diplexer 74, the reconfigurable RF filter circuitry 76 includes BAW RF filter circuitry coupled between the first pair of quadrature ports and the second pair of quadrature ports.

In one embodiment of the reconfigurable RF receive diplexer 74, the variable capacitance circuit 36 provides at least one variable capacitance to the reconfigurable RF filter circuitry 76, such that filtering characteristics of the reconfigurable RF filter circuitry 76 are based on at least the one variable capacitance, which is based on the first function configuration signal FCS1.

Those skilled in the art will recognize improvements and modifications to the embodiments of the present disclosure. All such improvements and modifications are considered within the scope of the concepts disclosed herein and the claims that follow.

What is claimed is:

1. A reconfigurable RF receive diplexer comprising:
   a first hybrid RF coupler having a first main port, a first pair of quadrature ports, and a first isolation port;
   a second hybrid RF coupler having a second main port and a second pair of quadrature ports; and
   reconfigurable RF filter circuitry coupled between the first pair of quadrature ports and the second pair of quadrature ports, wherein the reconfigurable RF receive diplexer is configured to:
      receive a first adjunct RF antenna receive signal via the first isolation port to provide a first adjunct RF receive signal via the second main port;
      receive a first RF transmit signal via the first main port to provide a first RF antenna transmit signal via the first isolation port; and
      operate in each of a plurality of operating modes, such that during a first operating mode, a carrier frequency of the first adjunct RF antenna receive signal is within a first RF communications band; and during a second operating mode, a carrier frequency of the first adjunct RF antenna receive signal is within a second RF communications band.

2. The reconfigurable RF receive diplexer of claim 1 further configured to receive a first RF antenna receive signal via the first isolation port to provide a first RF receive signal via the first main port.

3. The reconfigurable RF receive diplexer of claim 2 wherein the first RF receive signal and the first adjunct RF receive signal are carrier aggregation RF receive signals.

4. The reconfigurable RF receive diplexer of claim 2 wherein:
   the first hybrid RF coupler is further configured to receive the first RF antenna receive signal via the first isolation port, and split and phase-shift the first RF antenna receive signal to provide a first in-phase RF receive signal and a first quadrature-phase RF receive signal to the reconfigurable RF filter circuitry;
   the reconfigurable RF filter circuitry is further configured to substantially reflect the first in-phase RF receive signal and the first quadrature-phase RF receive signal to provide a first reflected in-phase RF receive signal and a first reflected quadrature-phase RF receive signal to the first hybrid RF coupler; and
   the first hybrid RF coupler is further configured to receive, phase-shift, and combine the first reflected in-phase RF receive signal and the first reflected quadrature-phase RF receive signal to provide the first RF receive signal via the first main port.

5. The reconfigurable RF receive diplexer of claim 1 wherein:
   the first hybrid RF coupler is configured to receive, split, and phase-shift the first RF transmit signal to provide a first in-phase RF transmit signal and a first quadrature-phase RF transmit signal to the reconfigurable RF filter circuitry;
   the reconfigurable RF filter circuitry is configured to substantially reflect the first in-phase RF transmit signal and the first quadrature-phase RF transmit signal to provide a first reflected in-phase RF transmit signal and a first reflected quadrature-phase RF transmit signal to the first hybrid RF coupler; and
   the first hybrid RF coupler is further configured to receive, phase-shift, and combine the first reflected in-phase RF transmit signal and the first reflected quadrature-phase RF transmit signal to provide the first RF antenna transmit signal via the first isolation port.

6. The reconfigurable RF receive diplexer of claim 1 further configured to receive the first RF transmit signal and the first adjunct RF antenna receive signal simultaneously.

7. The reconfigurable RF receive diplexer of claim 1 wherein the reconfigurable RF filter circuitry comprises surface acoustic wave (SAW) RF filter circuitry coupled between the first pair of quadrature ports and the second pair of quadrature ports.

8. The reconfigurable RF receive diplexer of claim 1 wherein the reconfigurable RF filter circuitry comprises bulk acoustic wave (BAW) RF filter circuitry coupled between the first pair of quadrature ports and the second pair of quadrature ports.

9. The reconfigurable RF receive diplexer of claim 1 further comprising a variable capacitance circuit configured to provide at least one variable capacitance to the reconfigurable RF filter circuitry wherein filtering characteristics of the reconfigurable RF filter circuitry are based on the at least one variable capacitance, which is based on a function configuration signal.

10. The reconfigurable RF receive diplexer of claim 1 wherein the first isolation port is coupled to a first RF antenna.

11. The reconfigurable RF receive diplexer of claim 1 wherein the first isolation port is coupled to a selected one of a first RF antenna and a second RF antenna via RF antenna switching circuitry.

12. The reconfigurable RF receive diplexer of claim 11 wherein the first main port is coupled to RF multiplexing circuitry via the RF antenna switching circuitry.

13. The reconfigurable RF receive diplexer of claim 11 wherein a selected another of the first RF antenna and the second RF antenna is coupled to RF multiplexing circuitry via the RF antenna switching circuitry.

14. The reconfigurable RF receive diplexer of claim 1 wherein:
   the reconfigurable RF filter circuitry comprises first RF filter circuitry, second RF filter circuitry, a first group of RF switches, and a second group of RF switches;

the first group of RF switches is coupled between the first RF filter circuitry and the first pair of quadrature ports;

the first group of RF switches is further coupled between the first RF filter circuitry and the second pair of quadrature ports;

the second group of RF switches is coupled between the second RF filter circuitry and the first pair of quadrature ports; and the second group of RF switches is further coupled between the second RF filter circuitry and the second pair of quadrature ports.

15. The reconfigurable RF receive diplexer of claim 14 wherein:

during the first operating mode, each of the first group of RF switches is configured to be in a CLOSED state, thereby functionally coupling the first RF filter circuitry between the first pair of quadrature ports and the second pair of quadrature ports;

during the first operating mode, each of the second group of RF switches is configured to be in an OPEN state, thereby functionally isolating the second RF filter circuitry from the first pair of quadrature ports and from the second pair of quadrature ports;

during the second operating mode, each of the first group of RF switches is configured to be in an OPEN state, thereby functionally isolating the first RF filter circuitry from the first pair of quadrature ports and from the second pair of quadrature ports; and during the second operating mode, each of the second group of RF switches is configured to be in a CLOSED state, thereby functionally coupling the second RF filter circuitry between the first pair of quadrature ports and the second pair of quadrature ports.

16. The reconfigurable RF receive diplexer of claim 1 further comprising a third hybrid RF coupler, wherein:

the reconfigurable RF filter circuitry comprises first RF filter circuitry, second RF filter circuitry, a first group of RF switches, and a second group of RF switches;

the second hybrid RF coupler further has a second isolation port;

the third hybrid RF coupler has a third main port, a third pair of quadrature ports, and a third isolation port;

the first group of RF switches is coupled between the first RF filter circuitry and the second pair of quadrature ports;

the second group of RF switches is coupled between the second RF filter circuitry and the second pair of quadrature ports;

the first RF filter circuitry is directly coupled to the first pair of quadrature ports; and the second RF filter circuitry is directly coupled to the third pair of quadrature ports.

17. The reconfigurable RF receive diplexer of claim 16 wherein:

during the first operating mode, the first hybrid RF coupler is configured to receive the first adjunct RF antenna receive signal via the first isolation port to provide the first adjunct RF receive signal via the second main port;

during the first operating mode, the first hybrid RF coupler is further configured to receive the first RF transmit signal via the first main port to provide the first RF antenna transmit signal via the first isolation port;

during the second operating mode, the third hybrid RF coupler is configured to receive the first adjunct RF antenna receive signal via the third isolation port to provide the first adjunct RF receive signal via the second main port; and during the second operating mode, the third hybrid RF coupler is further configured to receive the first RF transmit signal via the third main port to provide the first RF antenna transmit signal via the third isolation port.

18. The reconfigurable RF receive diplexer of claim 16 wherein phase-shifting characteristics of the second hybrid RF coupler are tunable based on a function configuration signal, such that during the first operating mode, the second hybrid RF coupler has a first phase-shift characteristic; and during the second operating mode, the second hybrid RF coupler has a second phase-shift characteristic.

19. The reconfigurable RF receive diplexer of claim 1 wherein:

the reconfigurable RF filter circuitry comprises first RF filter circuitry, second RF filter circuitry, and a group of antenna facing RF switches;

the group of antenna facing RF switches is coupled between the first RF filter circuitry and the first pair of quadrature ports;

the group of antenna facing RF switches is further coupled between the second RF filter circuitry and the first pair of quadrature ports; and during a third operating mode of the plurality of operating modes, each of the group of antenna facing RF switches is configured to be in an OPEN state, thereby functionally isolating the first RF filter circuitry from the first pair of quadrature ports and functionally isolating the second RF filter circuitry from the first pair of quadrature ports.

20. A method for operating a reconfigurable RF receive diplexer comprising:

receiving a first RF transmit signal via a first main port to provide a first RF antenna transmit signal via an isolation port;

receiving a first adjunct RF antenna receive signal via the isolation port to provide a first adjunct RF receive signal via a second main port; and operating in each of a plurality of operating modes, such that during a first operating mode, a carrier frequency of the first adjunct RF antenna receive signal is within a first RF communications band; and during a second operating mode, a carrier frequency of the first adjunct RF antenna receive signal is within a second RF communications band.

* * * * *